US012614460B2

(12) United States Patent
Reddy

(10) Patent No.: US 12,614,460 B2
(45) Date of Patent: Apr. 28, 2026

(54) ADAPTIVE FILTER FOR MESSAGE PROCESSING IN VEHICLE-MESSAGING ENVIRONMENT

(71) Applicant: Harman International Industries, Incorporated, Stamford, CT (US)

(72) Inventor: Sridhar Vellenki Reddy, Bangalore (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 230 days.

(21) Appl. No.: 18/570,039

(22) PCT Filed: Jun. 21, 2021

(86) PCT No.: PCT/US2021/038294
§ 371 (c)(1),
(2) Date: Dec. 13, 2023

(87) PCT Pub. No.: WO2022/271151
PCT Pub. Date: Dec. 29, 2022

(65) Prior Publication Data
US 2024/0265809 A1 Aug. 8, 2024

(51) Int. Cl.
*G08G 1/16* (2006.01)
*G08G 1/01* (2006.01)
*H04W 4/40* (2018.01)

(52) U.S. Cl.
CPC ........... *G08G 1/161* (2013.01); *G08G 1/0133* (2013.01); *H04W 4/40* (2018.02)

(58) Field of Classification Search
CPC ...... G08G 1/161; G08G 1/0133; G08G 1/166; G08G 1/167; G08G 1/162; H04W 4/40;
(Continued)

(56) References Cited

U.S. PATENT DOCUMENTS

2010/0195576 A1 8/2010 Kong et al.
2016/0203711 A1* 7/2016 Scherping ............. H04W 4/027
                                                              370/310
(Continued)

FOREIGN PATENT DOCUMENTS

CN       107347030 A    11/2017
DE    102010002092 A1   12/2010
WO     2020247162 A1    12/2020

OTHER PUBLICATIONS

ISA European Patent Office, International Search Report and Written Opinion Issued in Application No. PCT/US2021/038294, Mar. 3, 2022, WIPO, 45 pages.

*Primary Examiner* — Stephanie T Su
(74) *Attorney, Agent, or Firm* — McCoy Russell LLP

(57) ABSTRACT

An electronic system and method of identifying and discarding messages from irrelevant targets at an early stage of a message processing flow to reduce messages for further transmitting and processing. The system is configured to receive, by a first vehicle computing device at a first geographic location, a message from a second vehicle computing device, decode a portion of the message to determine a second geographic location of the second vehicle computing device, identify a type of safety application applied by the first vehicle computing device, classify the message based at least in part on the type of the safety application, the first geographic location, and the second geographic location, and determine, based on classifying the message, whether to discard the message or forward the message for processing to the safety application. The system is further configured to filter the message based on a filter table.

20 Claims, 17 Drawing Sheets

(58) Field of Classification Search
CPC ......... H04W 4/02; H04W 4/46; G01S 5/0072;
H04L 67/12; H04L 67/52
See application file for complete search history.

(56) References Cited

U.S. PATENT DOCUMENTS

| | | | | |
|---|---|---|---|---|
| 2018/0063082 A1* | 3/2018 | Nenov | ................ | H04L 63/0236 |
| 2018/0286242 A1* | 10/2018 | Talamonti | .............. | B60K 35/23 |
| 2022/0410710 A1* | 12/2022 | Alalao | ................... | B60K 35/28 |
| 2023/0138163 A1* | 5/2023 | Sivanesan | .............. | G08G 1/162 |
| | | | | 701/301 |

* cited by examiner

| MAC Address | Expiry Timer |
|---|---|
| Node A MAC Address | 1.2 seconds |
| Node B MAC Address | 300 milliseconds |
| • • • | • • • |

601
603
605
600

800

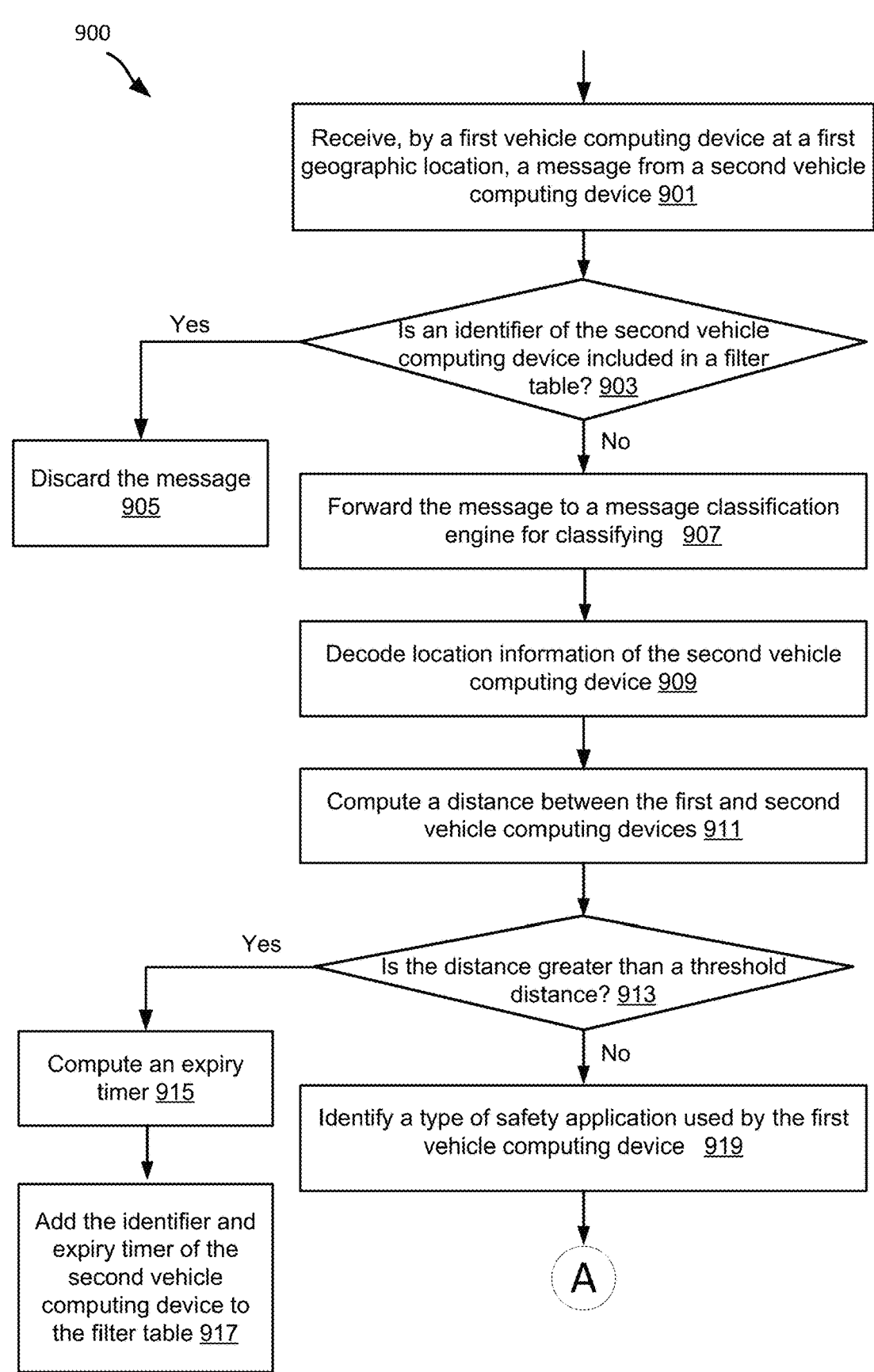

900

Receive, by a first vehicle computing device at a first geographic location, a message from a second vehicle computing device 901

Is an identifier of the second vehicle computing device included in a filter table? 903

Yes

Discard the message 905

No

Forward the message to a message classification engine for classifying 907

Decode location information of the second vehicle computing device 909

Compute a distance between the first and second vehicle computing devices 911

Is the distance greater than a threshold distance? 913

Yes

Compute an expiry timer 915

Add the identifier and expiry timer of the second vehicle computing device to the filter table 917

No

Identify a type of safety application used by the first vehicle computing device 919

ADAPTIVE FILTER FOR MESSAGE PROCESSING IN VEHICLE-MESSAGING ENVIRONMENT

CROSS-REFERENCE TO RELATED APPLICATIONS

The present application is a U.S. National Phase of International Application No. PCT/US2021/038294, entitled "ADAPTIVE FILTER FOR MESSAGE PROCESSING IN VEHICLE-MESSAGING ENVIRONMENT", and filed on Jun. 21, 2021. The entire contents of the above-listed application are hereby incorporated by reference for all purposes.

FIELD

The present application is directed to systems and methods of traffic message monitoring and processing, and in particular to methods of identifying and discarding messages from irrelevant targets at an early stage of a message processing flow to reduce messages for further transmitting and processing.

BACKGROUND

In a V2X (vehicle-to-everything) environment, including a vehicle-to-vehicle (V2V) or vehicle-to-infrastructure (V21) system, various nodes broadcast a number of safety messages at a regular interval. These nodes can be vehicles that transmit messages providing locations, time, speeds, and other vehicle-related information. These nodes can also be infrastructure equipment such as roadside signage, traffic cones, traffic lights, etc., that provide necessary information to help understand the situation around the vehicles.

Upon receiving safety messages from other nodes including remote vehicles (RVs), a host vehicle (HV) may process the safety messages to determine a time-to-collision (TTC) status between itself and other RVs, or perform other operations required for situational awareness. Usually the HV processes all the incoming messages periodically, which results in a high demand for the HV's processing power. The HV's processing demand is proportional to the number of nodes and the number of messages received from the nodes. Therefore, the HV's message handling can be burdensome or even problematic in a dense environment involving many vehicles. Moreover, additional processing requirements such as message security signature verification that is highly CPU intensive and expensive cause further consumption of HV's processing power. However, in practice, the vehicles that can actually impose a collision threat on an HV are likely few when compared to a large number of vehicles on the road. For example, only a handful out of a hundred or more vehicles in the vicinity of a HV may potentially affect the safety of the HV. Therefore, there is a need for systems and methods that enable the HV to efficiently process the received safety messages.

SUMMARY

In one aspect, an adaptive filtering system for identifying and discarding messages from irrelevant targets includes a processor, and a memory, coupled to the processor, configured to store processor executable instructions. The instructions, when executed by the processor, cause the processor to receive, by a first vehicle computing device at a first geographic location, a message from a second vehicle computing device, to decode a portion of the message to determine a second geographic location of the second vehicle computing device, to identify a type of safety application applied by the first vehicle computing device, to classify the message based at least in part on the type of the safety application, the first geographic location, and the second geographic location, and to determine, based on classifying the message, whether to discard the message or forward the message for processing to the safety application.

In another aspect, a method of identifying and discarding messages from irrelevant targets includes receiving, by a first vehicle computing device at a first geographic location, a message from a second vehicle computing device, decoding a portion of the message to determine a second geographic location of the second vehicle computing device, identifying a type of safety application applied by the first vehicle computing device, classifying the message based at least in part on the type of the safety application, the first geographic location, and the second geographic location, and determining, based on classifying the message, whether to discard the message or forward the message for processing to the safety application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 9A and 9B are a flowchart illustrating an example method for processing an incoming message based on early target/message classification and MAC filtering;

DETAILED DESCRIPTION

Figure 1:
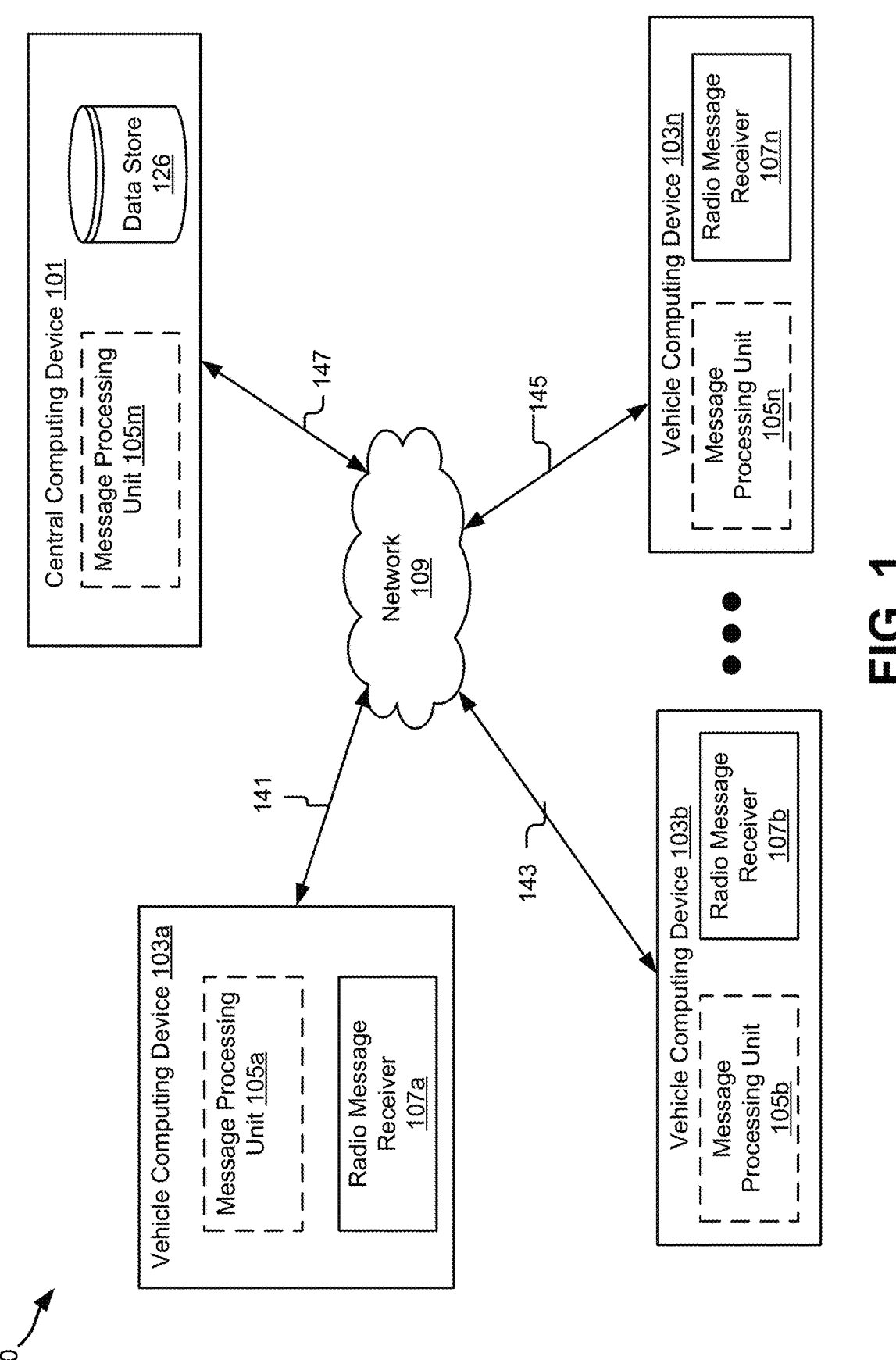
FIG. 1 is a block diagram of an example adaptive filtering system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

A V2X node in a V2X system—e.g., a host vehicle (HV)—receives a safety message packet over-the-air (OTA) by a wireless receiver/Media Access Control (MAC) chip, and forwards it to an embedded software driver of a computing system for processing. Currently in the art, this software driver hands the packet to an appropriate function to parse, perform signature verifications (if appropriate), decode, extract relevant payload contents, analyze, and then compute a time-to-collision (TTC) or determine relevancy (e.g., importance) of a remote vehicle (RV) to the HV. In other words, existing approaches take a safety message through a MAC layer, a network layer, a transport layer, et cetera, of an open system interconnection (OSI) reference model all the way to the application layer, where the existing approaches filter the safety message based on a set of criteria to determine whether to include or exclude the safety message based on the determined TTC or relevancy.

Since each of these functions at different layers require non-trivial processing power, the existing approaches spend limited CPU power on handling the safety message for each of these functions before eventually determining whether the received message is relevant or should be considered for TTC calculations. Given that only a few V2X nodes in the vicinity can pose a threat or present messages of importance, the existing approaches waste a large amount of processing power performing operations on messages/packets that are not of interest. For example, if an RV is far away from an HV (e.g., 400 meters ahead of the HV) and is of no importance to the HV (e.g., is unlikely to collide with the HV), traversing and processing the message(s) received from the RV through a number of processing layers is redundant knowing that the distant RV will be filtered out in a subsequent operation at the application layer. The present application provides early classification/filtering to rule out irrelevant vehicles without redundant processing, and thus avoids unnecessary consumption of limited computing power and network bandwidth otherwise used by the redundant processing.

Additionally, when performing a filtering operation, the existing approaches do not determine the importance or relevancy of an RV to an HV, or use this relevancy information to determine how to act on the message(s) received from the RV in the near future. The present application provides an adaptive relevancy filter that configures the time during which a node can be filtered out (e.g., an expiry timer) and adjusts the expiry timer based on the relevancy. It provides a mechanism by which current knowledge can be used to determine future course of action (in terms of relevancy). As a result, the present application bypasses the need to repeatedly examine or process every message at every message interval for a time period specified by the expiry timer. In a typical V2X environment, where over 100 RVs can easily be within the wireless range of an HV and transmit messages every 100 milliseconds (ms) or more often, the present application allows the HV to examine messages from a limited number of RVs rather than 100 RVs in a given time period (e.g., next three seconds) because only these limited number of RVs would be a safety threat to the HV in these three seconds. As compared to the existing approaches that process every message at every interval, the present application supports fewer message processing at fewer time intervals, which significantly reduces the utilization of processing power and improves computing efficiency. In particular, the network bandwidth within the processor system between different sub-systems and the network bandwidth between different computation systems within an overall vehicle system are greatly saved.

FIG. 1 is a block diagram of an example adaptive filtering system 100. As shown, the system 100 includes a central computing device 101 and one or more vehicle computing devices 103a . . . 103n coupled for electronic communication via a network 109. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of central computing device 101, vehicle computing devices 103, or networks 109, or central computing devices 101. Moreover, the system 100 may include one or more entities that represent roadside infrastructure transmitting environment data to the central computing device 101 and the vehicle computing devices 103 via the network 109.

The network 109 may be a conventional wireless network including one or more near field networks (e.g., Bluetooth®, NFC, etc.), vehicular networks, and/or other interconnected data paths across which multiple devices may communicate. The network 109 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some implementations, the network 109 may be a wireless network using a connection such as Dedicated Short Range Communication (DSRC), Cellular V2X (C-V2X), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, vehicle-to-infrastructure/vehicle-to-everything (V2I/V2X) networks, or any other wireless networks.

The vehicle computing devices 103a . . . 103n (or collectively vehicle computing device 103) may include virtual or physical computer processors, memor(ies), communication interface(s)/device(s), etc., which along with other components of the vehicle computing device 103 are coupled to the network 109 via signal lines 141, 143, and 145 to send and receive data to and from other vehicle computing device(s) 103 and/or the central computing device 101, and further to analyze and process the data. In some implementations, the vehicle computing device 103 may be installed on a vehicle, an automobile, an agricultural machine, a motorcycle, a bicycle, a bus, a boat, a drone, a plane, etc. For simplicity, a vehicle computing device is merely described in association with a vehicle below.

In the illustrated implementation, the vehicle computing devices 103a . . . 103n include instances 105a and 105b . . . 105n of a message processing unit 105 and instances 107a and 107b . . . 107n of a radio message receiver 107. The radio message receiver 107 includes hardware and/or software logic for receiving the data or message from other vehicle computing device(s) 103 and/or central computing device 101 associated with other nodes, and passing the message internally to the message processing unit 105 for processing. The received data may include data related to vehicle operating states (e.g., transmission, speed, acceleration, deceleration, etc.), data related to vehicle environment (e.g., a moving direction, a geographic location such as Global Positioning system (GPS) coordinates or other Global Navigation Satellite System (GNSS) coordinates, etc.), roadside data (e.g., a traffic status, accident information, etc.) received from the roadside infrastructure entities (not shown), internal and external scene images captured by image sensors deployed on a vehicle (not shown), or other data related to vehicles and/or environment.

In some implementations, the received data used to determine the importance or relevancy of a RV to a HV and to further determine a safety condition of the HV (e.g., whether a collision may occur) are referred to as safety messages. Although the present disclosure mainly describes safety message processing, it should be understood that the techniques described herein generally apply to the processing of other messages. For this reason, the term "message" and "safety message" may be used interchangeably in the description hereafter.

Figure 3A:
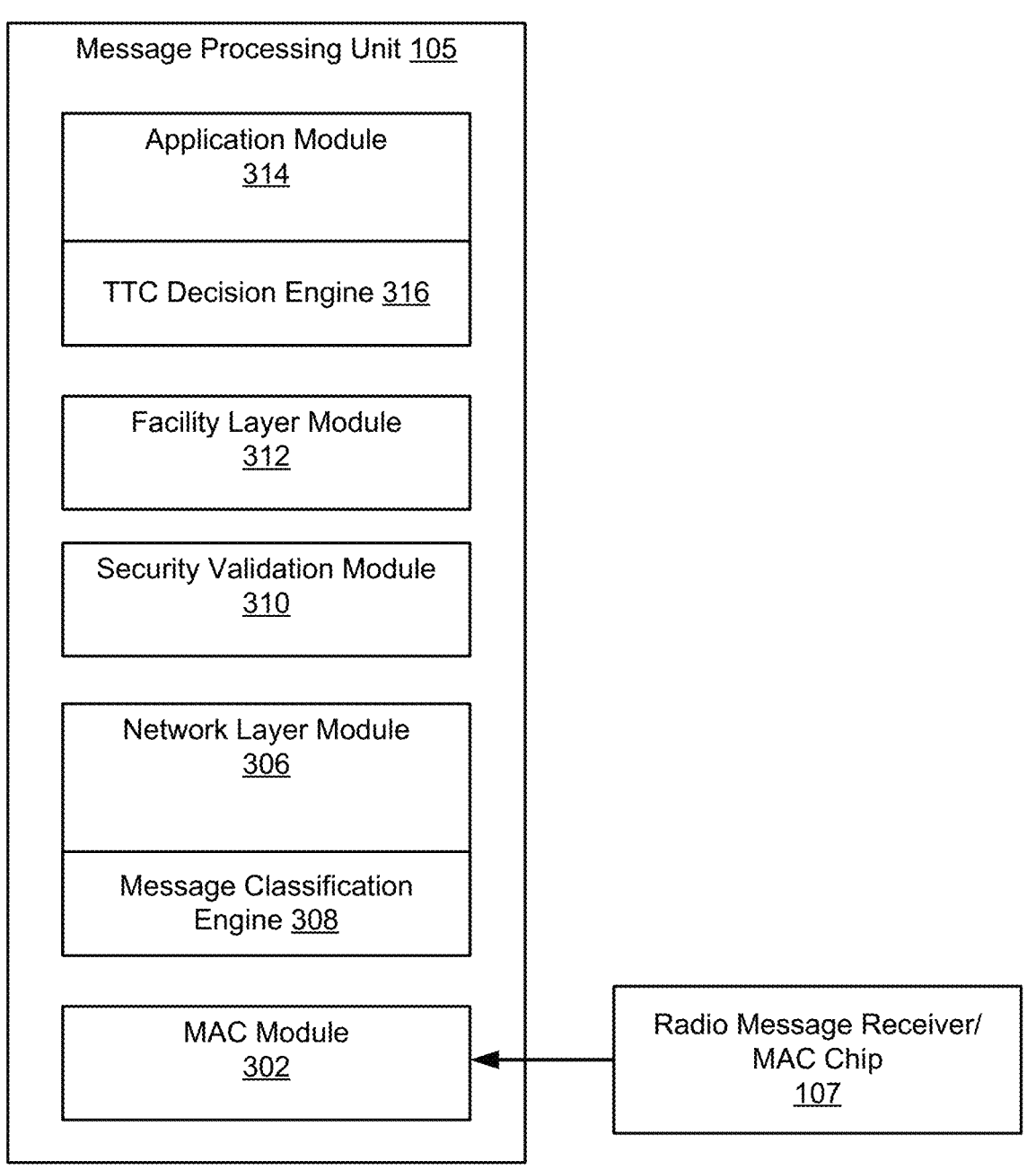
FIG. 3A is a block diagram of example components of a message processing unit for performing early message classification.
Figure 3B:
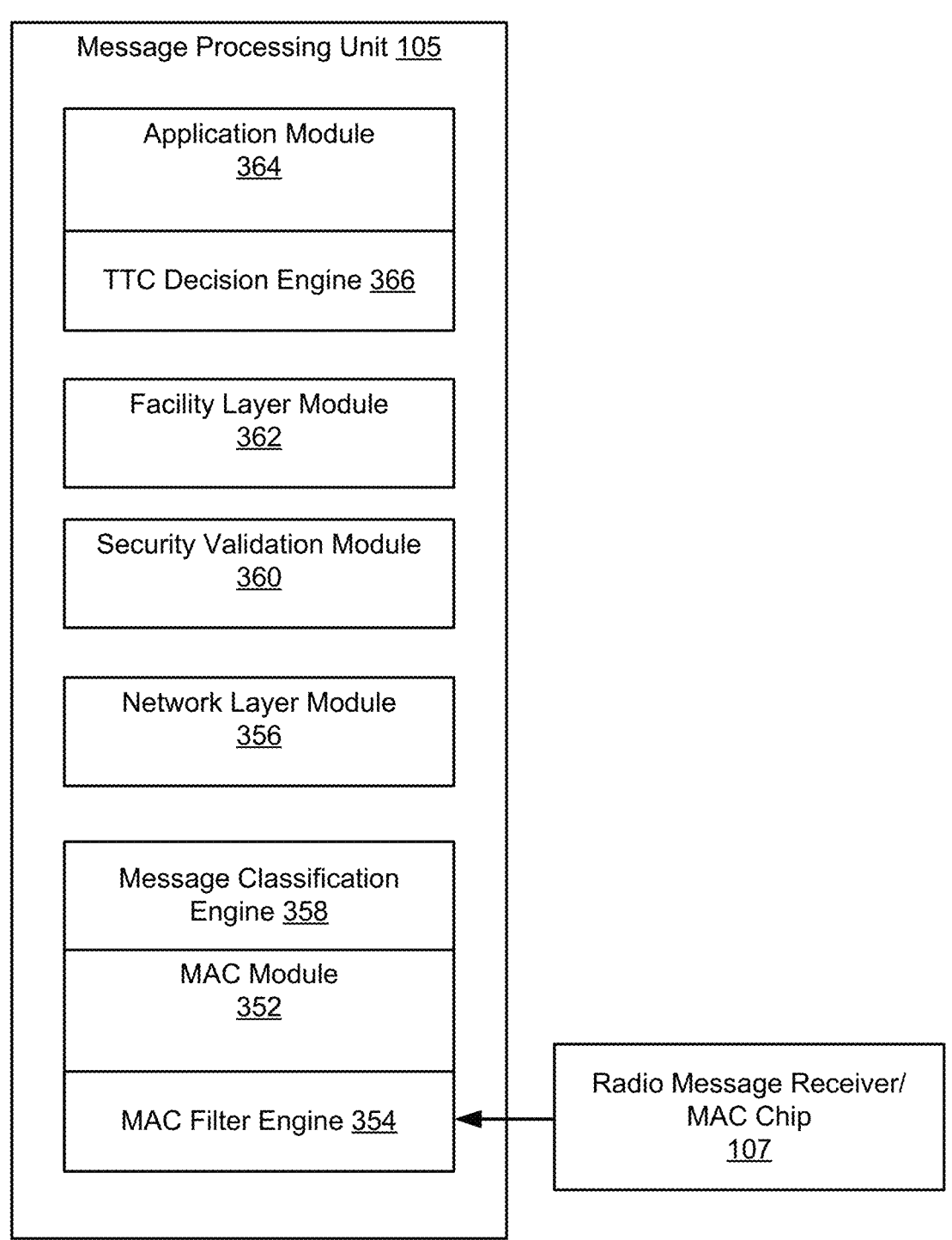
FIG. 3B is a block diagram of example components of a message processing unit for performing MAC filtering as well as early message classification.

The message processing unit 105 includes hardware and/or software logic for receiving the safety messages passed by the radio message receiver 107, decoding vehicle information from the safety messages, and identifying a subset of safety messages that may traverse through multiple processing layers (as referenced to the OSI model) to a safety application (e.g., at the application layer of the OSI model) for further action. On one hand, the message processing unit 105, particularly an early message classification engine of the message processing unit 105 as depicted in FIGS. 3A and 3B, determines whether an RV falls within a relevance zone of an HV based on a message from the RV. Based on determination result, the HV discards or forwards the message to other processing layers for further analysis. This early message/target classification may apply to every message that is currently received. Based on the classification of the current messages, the message processing unit 105 also generates a filter table to filter the message(s) that will be received in a subsequent short time. Therefore, upon receiving a new message, the message processing unit 105, particularly a MAC filter engine 354 as depicted in FIG. 3B, determines whether the node sending the new message matches an entry in the filter table, and if it matches, discards this new message without even forwarding the new message for early classification, much less going through other processing layers subsequent to the classification operation. In this way, the message processing unit 105 not only filters the current incoming messages but also learns to filter the future incoming messages based on the filtering of the current messages. The message processing unit 105, therefore, uses dual-layer filtering to improve the filtering accuracy and efficiency. Example components of the message processing unit 105 will be described in detail with reference to FIG. 3A and FIG. 3B.

The central computing device 101 is a computing device that collects and processes safety messages from one or more vehicle computing devices 103. The central computing device 101 is communicatively coupled to the network 109 via the signal line 147. As depicted, the central computing device 101 also includes an instance of the message processing unit 105m. Each instance 105a . . . 105m may include one or more components of the message processing unit 105 depicted in FIGS. 3A and 3B, and may be configured to fully or partially perform the functionalities described therein depending on where the instance resides.

In some implementations, the central computing device 101 is a cloud server that possesses larger computing capabilities and computing resources than the vehicle computing device 103a. For example, the vehicle computing device 103a may merely receive the safety messages from another vehicle computing device 103 and forward the received messages to the central computing device 101. The central computing device 101 may then perform complex computation and identify any threatening vehicles for the vehicle computing device 103a. The central computing device 101 may also include a data store 126 to store data received from multiple vehicle computing devices and any other data generated and required for implementing the functionalities related to the central computing device 101.

Figure 2A:
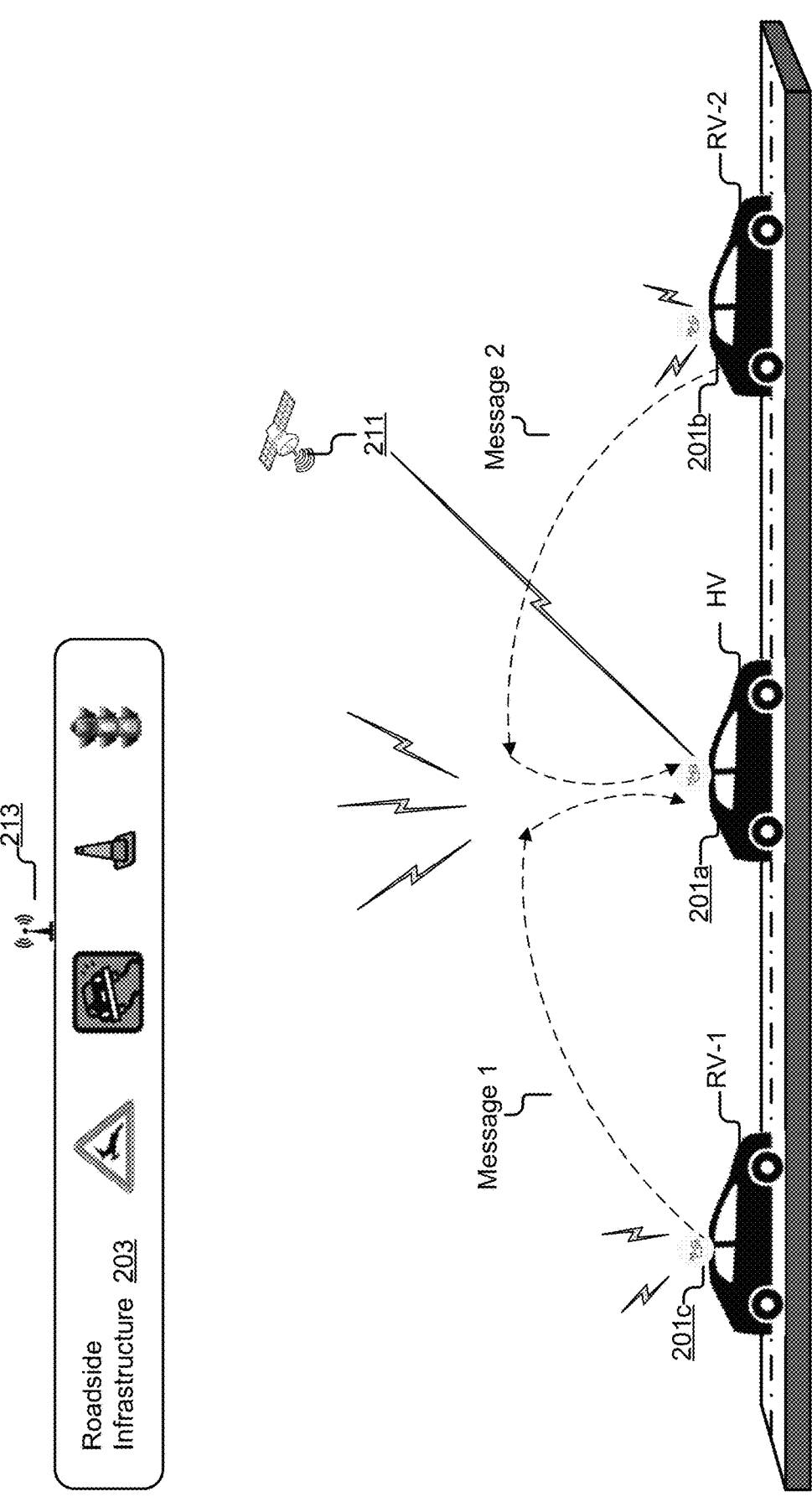
FIG. 2A is an example message transmission scenario among a host vehicle and two remote vehicles on a road segment.

FIG. 2A illustrates an example message transmission scenario among a HV and two RVs (RV-1 and RV-2) on a road segment. Each vehicle is equipped with a communication device that enables V2V communications, and/or V2I communications to collect and/or provide information to help understand the situation around the vehicle. As illustrated in the figure, the HV and two RVs respectively include a communication device 201a, 201b, and 201c. Each communication device may be embedded in the vehicle computing device 103 of the HV and RVs. For example, the communication device 201a may include a radio message receiver 107 such as a geopositioning receiver (e.g., a GPS receiver or other GNSS receiver) that communicates with a satellite 211 (e.g., a GPS satellite or other GNSS satellite) to determine location, time, and drive velocity of the HV. The communication device 201a may also include one or more message transmitters, receivers, or transceivers to communicate with the vehicle computing device 103 of RVs, the central computing device 101, or roadside infrastructure 203 via the network 109. The roadside infrastructure 203 provide traffic or roadside infrastructure information via wireless communication with an access point 213.

As depicted in FIG. 2A, the HV receives message 1 from RV-1 and message 2 from RV-2 at one time instant, for example, via the network 109. If the HV wants to know any vehicle in its blind spot through a blind spot warning application running on the vehicle computing device 103a of the HV, the vehicle computing device 103a may discard message 2 and process message 1 only because any vehicle ahead of HV such as RV-2 is not in HV's blind spot. The vehicle computing device 103a may also determine to discard messages from RV-2 for the next two seconds because of the distance and speed of HV and RV-2. However, if the HV wants to know any vehicle stops in its vicinity through a stationary vehicle warning application, the vehicle computing device 103*a* may discard both message 1 and message 2 received from the moving vehicles RV-1 and RV-2. Therefore, both current messages and future messages are filtered out to save processing power and network bandwidth of the vehicle computing device 103*a*.

Figure 2B:
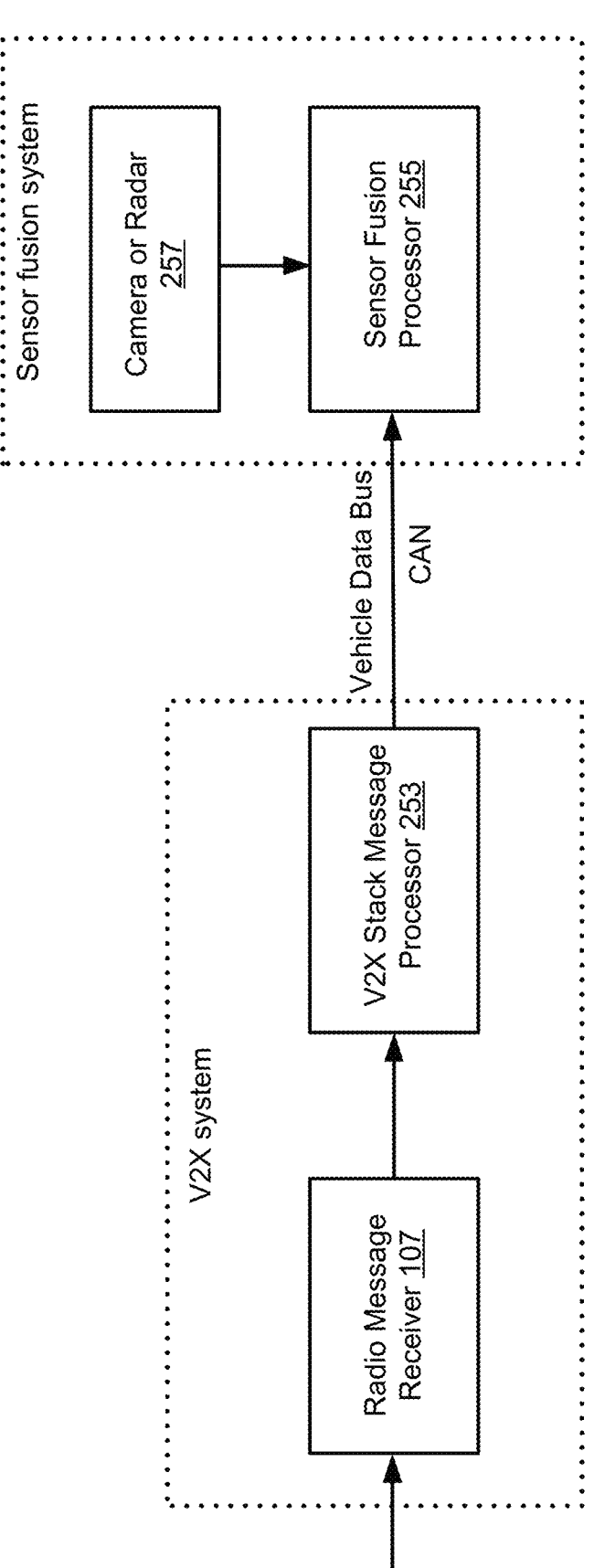
FIG. 2B is a high-level view of example processor functional partitioning in a V2X system coupled with a sensor fusion system.

A next issue is at what stage the message filtering should be implemented to save processing power and network bandwidth. Referring to FIG. 2B, which illustrates a high-level view of example processor functional partitioning in a V2X system coupled with a sensor fusion system. It could be common to use two different CPUs in the V2X system when communicating with the sensor fusion system. A V2X stack message processor 253 receives and processes V2X messages from V2X nodes (e.g., vehicles) via the radio message receiver 107. A sensor fusion processor 255 receives the V2X messages and data from other sensors such as a camera or radar 257 and provides the received data for processing by a safety application. The safety application determines one or more safety conditions such as a time-to-collision (TTC), an identifier of a threatening vehicle, etc., for a host vehicle. As depicted, the V2X stack message processor 253 passes the V2X messages to the sensor fusion processor 255 through an intra-vehicle data bus such as a controller area network (CAN) bus. Since the CAN bus is shared among many engine control units (ECUs), it can be very useful to reduce the amount of traffic that is transmitted over the CAN bus. To achieve this goal, the present application allows the V2X stack message processor 253 rather than the sensor fusion processor 255 to perform an early target/message classification operation to discard some V2X messages before transmitting them over the CAN bus. For example, if the safety application is a forward collision warning (FCW) application, the sensor fusion processor 255 would only fuse image data received from the camera or radar 257 in its field of view (e.g., front camera) and V2X messages from the V2X nodes that are present in that sector (e.g., the potential targets that may cause an FCW). The V2X stack message processor 253 therefore would filter out messages from all other V2X nodes.

The system 100 applies adaptive filtering in two aspects: (1) performing early target classification to reduce the number of V2X nodes that are found to be relevant, and (2) performing predict filtering/MAC filtering to obtain future filtering decisions using current relevancy information.

FIG. 3A is a block diagram of example components of a message processing unit 105 resided in the vehicle computing device 103 for performing early message classification. As depicted, the message processing unit 105 includes a MAC module 302, a network layer module 306, a security validation module 310, a facility layer module 312, and an application module 314. Referencing to the OSI model, each of the modules 302, 306, 310, 312, and 314 respectively performs functionality that is analogous to that of the data link layer, network layer, transport & session layers, presentation layer, and application layer. Similar to the OSI model, a message packet received from the radio message receiver 107 (analogous to a physical layer) is passed along the path of modules 304, 306, 310, 312, and 314 and processed in such order.

The MAC module 302 allows an HV to receive message packet(s) from RV(s) through the radio message receiver 107 of the HV. For example, the MAC module 302 receives messages from all RVs within the range of radio message receiver 107 of the HV periodically, e.g., every 100 ms. The MAC module 302 also accesses and processes each message packet, e.g., performs synchronizing, flow controlling, and error checking, based on the MAC address associated with the vehicle computing device 103 of a transmitting RV. The MAC module 302 forwards the message packet(s) to the network layer module 306.

The network layer module 306 performs operations including header and validation check, congestion controlling, packet sequencing, etc., on the message packet(s). Additionally, the network layer module 306 forwards each received packet for early classification by a message classification engine 308 included in the network layer module 306.

Figure 4A:
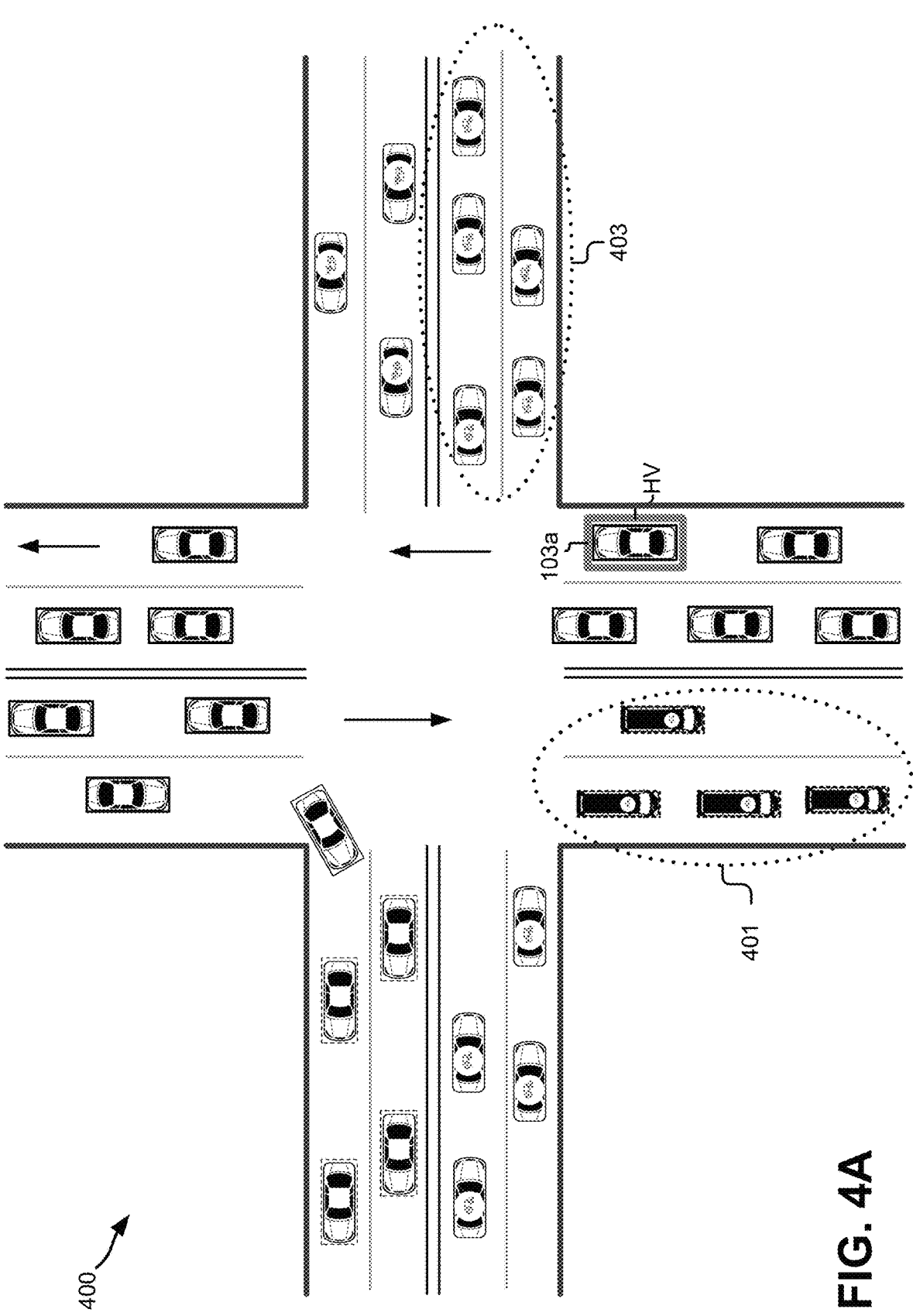
FIG. 4A illustrates a couple of irrelevant target remote vehicle clusters from the perspective of a host vehicle in an example scenario.

The message classification engine 308 classifies the message packet(s) to identify relevant target RV(s) for the HV, as shown in an example scenario 400 of FIG. 4A. The scenario shows vehicles in all directions of an intersection road. The HV is the vehicle equipped with the vehicle computing device 103*a*. If a processor of the vehicle computing device 103*a* is performing a blind spot sensor fusion in conjunction with a radar or camera 257 (as depicted in FIG. 2B), the message classification engine 308 may determine that the vehicles in the opposite direction of travel (e.g., in a dash-lined zone 401) are not relevant with the HV. Similarly, if the processor of the vehicle computing device 103*a* in the HV deals with front collision/threats, the message classification engine 308 may determine that vehicles to the right of the HV and moving away from the intersection (e.g., in a dash-lined zone 403) are irrelevant. Therefore, the message classification engine 308 identifies different irrelevant vehicles for the HV based on different types of applications, e.g., detecting blind spot or front collision. These applications, also referred to as safety applications, are implemented by the application module 314 (described below) at the equivalent application layer of the OSI model.

In some implementations, the message classification engine 308 decodes a portion of the message packet to obtain the information required for message classification. Since data decoding requires considerable CPU resources, the message classification engine 308 may only perform partial decoding of certain bytes/data of the message packet to identify key parameters. For example, the message classification engine 308 may decode partial payload of the message packet to obtain latitude, longitude, elevation coordinates while leaving other content unchanged.

In some implementations, the message classification engine 308 determines, from the decoded information, geographic locations of the RVs transmitting the message packets to the HV at a location (e.g., obtained from GPS data, or other GNSS data), and constructs a location map. The message classification engine 308 identifies a type of safety application running by the application module 314 on the HV. The safety application includes, but is not limited to, a forward collision warning application, an intersection movement assist application, a blind spot warning application, a left turn assist application, a lane change warning application, a control loss warning application.

The message classification engine 308 then determines a relevance zone based on the location map and the type of safety application. If an RV falls within the relevance zone, the message classification engine 308 determines that the RV is relevant to HV and forwards the message packet transmitted by the RV to the security validation module 310 for further processing. Otherwise, the message classification engine 308 determines that the message packet is irrelevant and discards it without going upstream to the security validation module 310. In some implementations, the message classification engine 308 may also identify more than one type of safety application running on the HV and incorporate multiple zonal relevancies.

Instead of leaving a safety application to choose which message to process at the final stage of a data flow (e.g., removing messages for computing TTC when computing the TTC at the application layer of the OSI model), the message classification engine 308 makes such choice much earlier. The message classification engine 308 reduces the number of relevant nodes/RVs and the number of messages going upstream at an early stage of a data flow, e.g., at the network layer of the OSI model, which significantly saves computing resources and improves efficiency.

Figure 4B:
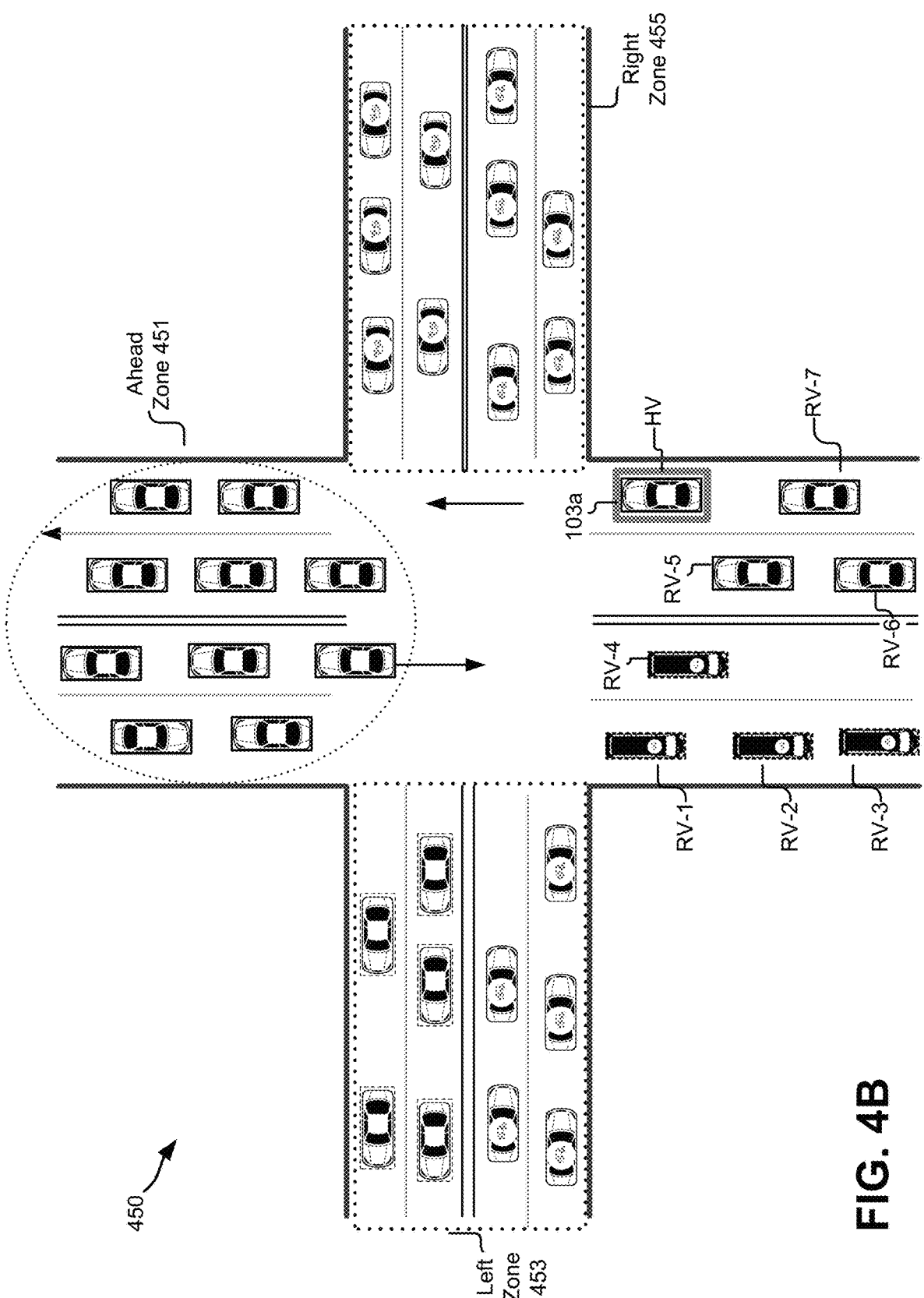
FIG. 4B illustrates multiple target classification zones in an example forward collision scenario.

FIG. 4B illustrates multiple target classification zones in an example forward collision scenario 450. Assuming that the safety application running on the vehicle computing device 103a of the HV is a forward collision warning application, the message classification engine 308 classifies the areas around the HV into an ahead zone 451, a left zone 453, and a right zone 455 based on locations of the RVs transmitting messages to the HV and the location of the HV. As depicted, each zone is a region surrounded by dashed lines. In reality, these zones could follow any polygon or any dimension depending on the implementation. Note that the three zones 451, 453, and 455 do not include vehicles RV-1 through RV-7. The message classification engine 308 might not classify these vehicles into any zones because none of these vehicles may pose a forward collision threat to the HV. Among the zones 451, 453, and 455, the message classification engine 308 further determines that only RVs in the forward/ahead zone 451 are relevant targets of the HV. As a result, the message classification engine 308 discards the RVs that fall in the left zone 453 and right zone 455 by not forwarding the message packets from these RVs to the security validation module 310. In the example of FIG. 4B, among a total of 30 RVs in the zones 451, 453, and 455, only messages of 10 RVs in the ahead zone 451 are sent by the message classification engine 308 upstream to the security validation module 310, thereby effectively reducing two-thirds of the overall processing power of the security validation module 310.

Referring back to FIG. 3A, upon distinguishing the irrelevant RV(s) from relevant RV(s) for an HV, the message classification engine 308 forwards the message(s) received at the HV from the relevant RV(s) to the security validation module 310. In some implementations, the security validation module 310 performs security and privacy operations on messages, including securing the messages, managing identities and security credentials of the messages, etc. For example, the security validation module 310 verifies the transmitting node/RV of a message. Since the security and privacy operations may require intensive computing power, a reduction of a significant number of messages inputted to the security validation module 310 as described above is particularly beneficial.

The facility layer module 312 provides a collection of functions to support application(s) run by the application module 314 described below. In some implementations, the facility layer module 312 provides data structures to store, aggregate, and maintain data of different types and sources. For example, the facility layer module 312 may translate the formats of messages from different vehicle sensors and from roadside infrastructure to adapt to the requirement of a safety application. The facility layer module 312 also establishes and maintains communication sessions with the application module 314 by enabling various types of applications and providing specific message handling, etc.

The application module 314 hosts and implements one or more applications, for example, with one or more application processors such as the sensor fusion processor 255 shown in FIG. 2B. The application module 314 may obtain information about road safety, traffic efficiency, infotainment, and business, etc., from implementing an application (at the application layer of the OSI model) using messages received from the facility layer module 312.

In some implementations, the application module 314 performs a safety application to determine a relevancy. The relevancy indicates the significance or importance of a transmitting node (e.g., an RV) to the receiving node (e.g., the HV). As depicted in FIG. 3A, the application may also include a TTC decision engine 316 to compute a TTC. The TTC indicates the time required for two vehicles to collide. Responsive to outputting the relevancy and TTC, the application module 314/TTC decision engine 316 further communicates with a notification engine (not shown) to send a notification to the HV, for example, to cause a warning to be displayed on a user interface of the vehicle computing device 103 associated with the HV. The application module 314 determines different relevancies and TTCs based on different types of safety applications, which will be described below in detail with reference to FIGS. 10A-10H.

Figure 5:
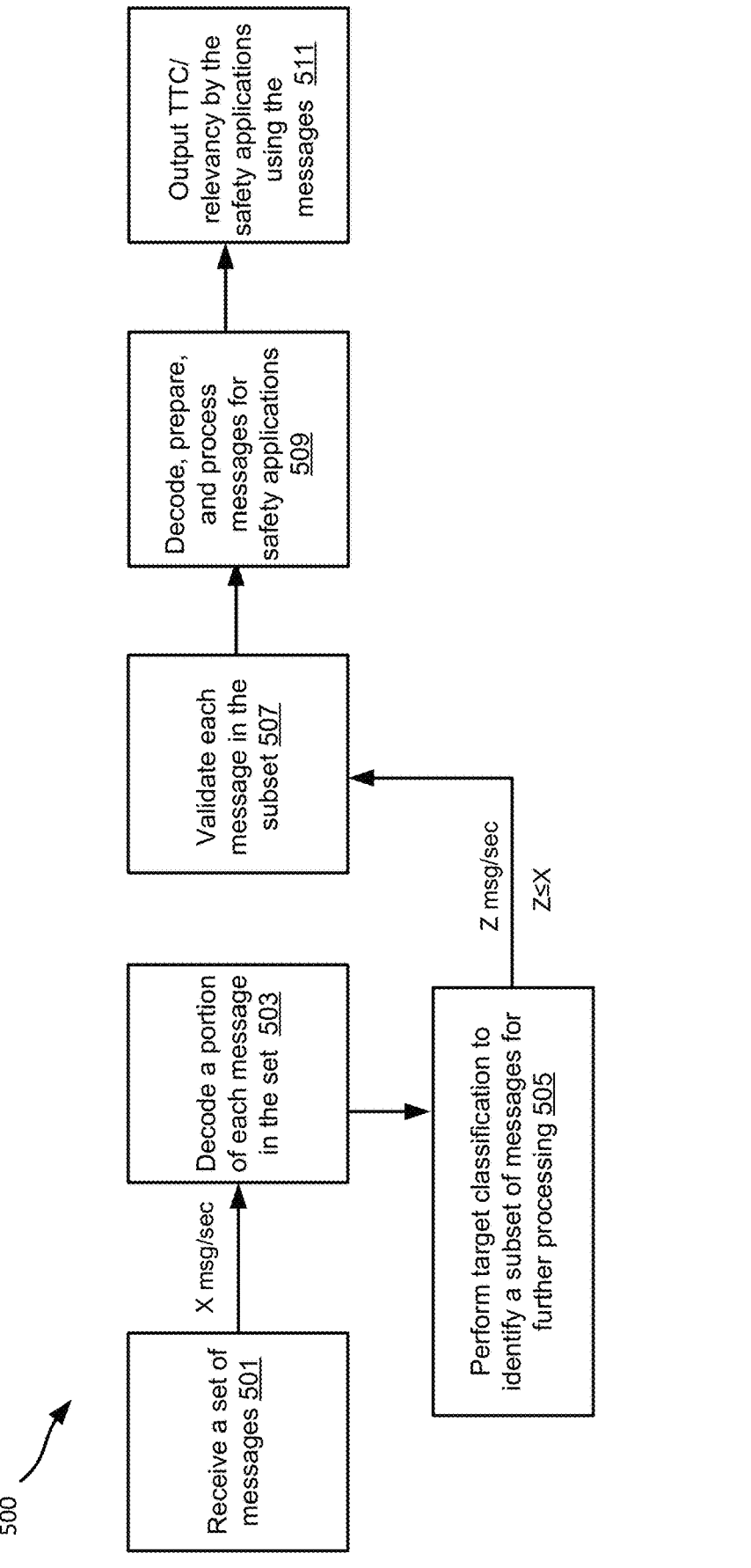
FIG. 5 is a block diagram of a message processing procedure based on early target/message classification.

FIG. 5 is a block diagram of a message processing procedure 500 performed by the message processing unit 105 based on early target/message classification. As depicted in FIG. 3A, the message processing unit 105 includes a MAC module 302, a network layer module 306, a security validation module 310, a facility layer module 312, and an application module 314. The network layer module 306 includes a message classification engine 308. The procedure 500 starts with the MAC module 302 receiving a set of V2X messages at a block 501. For example, X messages are transmitted from vehicle computing devices 103 of RVs within the range of the radio message receiver 107 of the vehicle computing device 103 of an HV and received by the HV equipped with the radio message receiver 107. X is a positive integer. Typically, an RV may send 10 messages per second and an HV may receive 1000 messages per second from 100 RVs nearby. At a block 503, the network layer module 306 decodes only a portion of each message in the set, e.g., data related to latitude, longitude, elevation. The network layer module 306 performs partial decoding to save processing resources.

The network layer module 306 forwards the messages to the message classification engine 308. At a block 505, the message classification engine 308 performs target classification to identify a subset of messages for further processing. In some implementations, the message classification engine 308 determines one or more relevance zones with respect to a type of safety application based on the geographic locations of RVs transmitting the messages and the HV receiving the messages, and then classifies the RVs based on whether an RV falls within a relevance zone. The message classification engine 308 filters out the RVs falling outside any relevance zone and forwards only messages transmitted from the rest of RVs to a next block for operating. Therefore, X messages inputted to the message classification engine 308 at block 505 are reduced to Z messages (e.g., a subset of X) for output to the security validation module 310 at a block 507.

At block 507, the security validation module 310 validates each message in the subset. At a block 509, the facility layer module 312 decodes, prepares, and processes the messages for safety applications. For example, the facility layer module 312 may aggregate data from different sources and modify formats of messages based on the application. At a block 511, the application module 314 allows the safety applications to output TTC/relevancy using the messages in the subset.

As shown in FIG. 5, the target classification functionality is involved much earlier within a message flow (e.g., at block 505) so that only messages from the targets within the region of interest or relevance zone may be forwarded to the subsequent processing blocks. For example, if only the targets for the forward collision warning (FCW) region are of interest, all other targets may be filtered out or dropped for transmission. Thus, for each incoming message, target classification is performed first, and only until then a decision is made on the subsequent course of actions, e.g., drop from the consideration or move to the next block 507.

Referring back to FIG. 3B, a block diagram of example components of a message processing unit 105 for performing MAC filtering and early message classification is provided. As depicted, the message processing unit 105 includes a MAC module 352, a network layer module 356, a security validation module 360, a facility layer module 362, and an application module 364 (including a TTC decision engine 366). The modules 352, 356, 360, 362, 364, and 366, which have like reference numbers as the modules 302, 306, 310, 312, 314, and 316 in FIG. 3A, perform some similar functionalities, and reference to same layers of the OSI model as the corresponding modules in FIG. 3A. The similar functionalities performed by the modules 352, 356, 360, 362, 364, and 366 will not be repeated herein. It is worthy to note, different from FIG. 3A, three components: a MAC filter engine 354, the MAC module 352, and a message classification engine 358 are combined together to form a particular functional block that performs early target classification and predict/MAC filtering. The new MAC filter engine 354 performs MAC filtering on received messages and forwards the MAC-filtered messages to the MAC module 352 and the message classification engine 358 for early target classification, and further to other modules 356, 360, 362, and 364 for processing in sequence. The modules/engines 352, 356, 358, 360, 362, and 364 perform similar processing as shown in FIG. 3A, and also perform additional functionalities to support the MAC filtering.

As described above in FIG. 3A, the message classification engine 308 examines the relevancy of each incoming message in the context of the zone into which it is placed. The message classification engine 308 repeats such examination at every message interval. In a V2X system, this message interval between transmitting/receiving a current message and a next message to/from a same node is typically 100 ms. However, even when the probability that an RV is relevant to an HV in the future (e.g., 200 ms later) is close to zero, the message classification engine 308 may still examine the two messages sent from the RV to the HV in the next 200 ms.

Here, in FIG. 3B, the MAC filter engine 354 is introduced to enable using current/historical information to determine future relevancy. Suppose that a first message from a specific target or relevant RV is processed and a TTC of seven seconds is determined. Also suppose that a four-second period is an extremely safe margin of operation. Then, this specific target can be safely ignored for three seconds. In other words, within the three seconds after processing the first message, the MAC filter engine 354 can discard a second, third, fourth . . . messages sent by this specific target without consuming any computing and network resources. An extreme safe margin is used herein for ease of understanding. In practice, a safe margin may be determined based on an end goal of an application.

In some implementations, the MAC filter engine 354 generates a filter table to filter the future messages received at a host V2X node/HV based on information about the processing of current messages at the HV. The filter table includes identifier(s) of target V2X node(s)/RV(s) and expiry timer(s) associated with target V2X node(s)/RV(s). The MAC filter engine 354 may discard the future message(s) from the target RV included in the filter table during a duration of the expiry timer associated with the target RV so that no incoming message from this specific target RV will be transmitted to the network layer module 356 or other upper-layer modules for any processing within a time period specified by the expiry timer.

Figure 6:
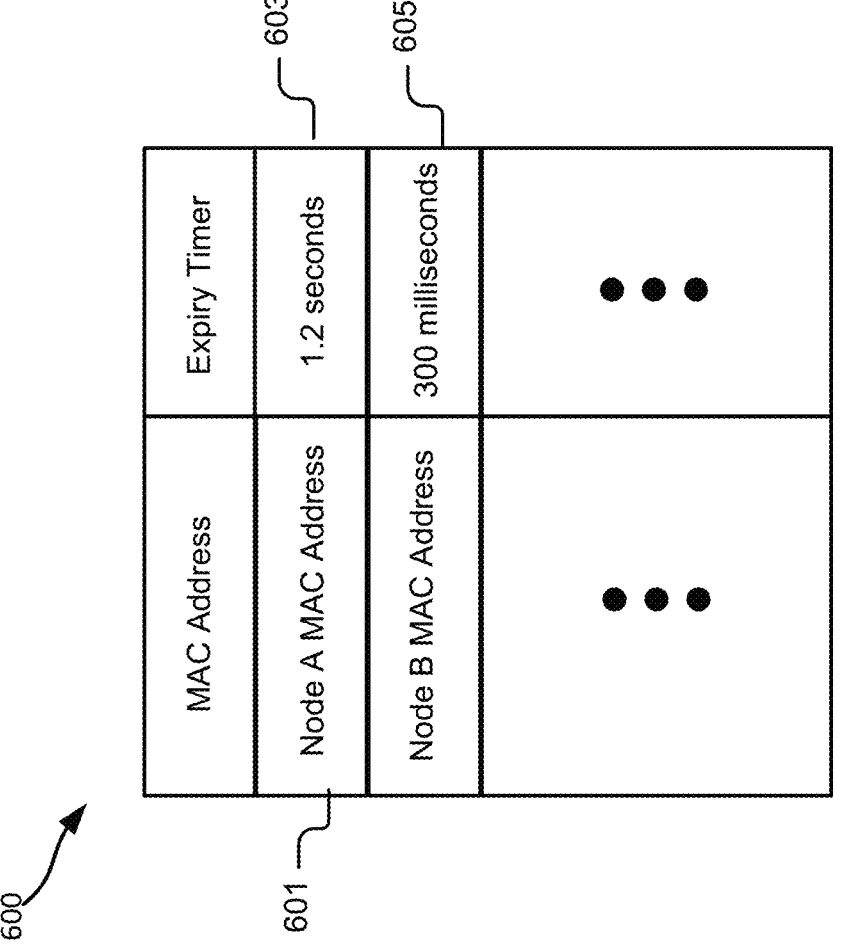
FIG. 6 is an example filter table.

FIG. 6 is an example filter table 600. Each entry in the table includes an identifier and an expiry time of a target RV. The target RV is a target V2X node that is irrelevant to the HV. The identifier that uniquely identifies the target RV may be a MAC address of the vehicle computing device 103 associated with the target as shown in FIG. 6. The identifier may also be a similar identifier or another field or a combination of more than one field extracted from the current message transmitted by the target. When the filter table includes MAC address(es) of target(s), the table is referred to as a MAC filter table, and the MAC filter engine 354 performs MAC filtering.

The expiry timer indicates a degree or life of irrelevancy of the target RV or V2X node within the filter table. As depicted in FIG. 6, a V2X node A with a unique MAC address 601 has an expiry timer of 1.2 seconds. This expiry timer 603 indicates that the table 600 will have an entry for node A with its expiry timer decrementing periodically until 1.2-second has elapsed. After the 1.2 seconds, the MAC filter engine 354 will remove the entry of node A from the table 600. However, within the duration of the 1.2 seconds, the MAC filter engine 354 will filter out the messages transmitted from this specific node A, and also modify the table 600 with a decrementing value of the expiry timer 603. For example, the MAC filter engine 354 may decrement the expiry timer 603 every 100 ms. At the end of a 100 ms duration, the MAC filter engine 354 would decrement the entire list of expiry timers across the filter table by the same amount, e.g., 100 ms.

Sometimes the identifier of the vehicle computing device 103 associated with a node/RV is changing over time, e.g., for privacy reasons. Although an identifier is only persistent for a node for a short period of time, the MAC filter engine 354 would still provide the benefit of filtering unwanted nodes within that duration based on the filter table 600. Given that the interval of persistency of the unique identifier is usually much larger than the expiry timer associated with it, the MAC filter engine 354 can still perform MAC filtering efficiently.

The message processing unit 105 examines/processes messages from V2X nodes at multiple stages (e.g., at equivalent different layers of the OSI model) based on various parameters such as distance, heading, TTC, speed, etc. In some implementations, the MAC filter engine 354 receives the examination result fed back by other upper-level modules of the message processing unit 105 to determine a degree of irrelevancy and compute the expiry time based on the degree of irrelevancy. Assume both node A and node B send safety messages to a host node (e.g., an HV) every 100 ms and node A is less relevant to the HV than node B (e.g., farther away from the HV in distance). As shown in FIG. 6, an expiry timer of 1.2 seconds in expiry timer 603 indicates that the MAC filter engine 354 will filter out the next 12 safety messages from node A while an expiry timer of 300 milliseconds in an expiry timer 605 indicates that the MAC filter engine 354 will only filter out the next three safety messages from node B.

When receiving an incoming message from a specific node (e.g., an RV) at a host node (e.g., an HV), the MAC filter engine 354 identifies the unique identifier of the specific vehicle computing device 103 associated with the specific RV, e.g., the identifier of the specific RV. The MAC filter engine 354 compares this identifier to the identifiers of known targets included in the filter table. If a match is found, the MAC filter engine 354 drops the message and filters out this specific RV. However, if no identifier match is found, the MAC filter engine 354 passes the message to the network layer module 356/message classification engine 358 for classifying and further determining whether to forward this message to the upper modules of the message processing unit 105 for processing.

Once receiving the message, the message classification engine 358 performs early classification. In some implementations, the message classification engine 358 computes a distance between the HV and the specific RV and compares the distance to a threshold distance. The threshold distance (e.g., 500 meters) is a safe distance that HV and RV would not collide with each other given vehicle speeds and other vehicle/environment parameters, which is also referred to as a minimum distance-based relevancy threshold or a minimum threshold distance. If the computed distance does not exceed the threshold distance (e.g., the HV and RV are relatively close to each other), the message classification engine 358 forwards the message to the upper modules to refine relevancy information (e.g., determining a TTC).

However, if the actual distance between the HV and RV exceeds the threshold distance, the message classification engine 358 determines that this specific RV is safe relative to the HV, e.g., irrelevant to HV, and discards this message from the RV to avoid further and unnecessary transmission and processing cost. Moreover, the message classification engine 358 feeds back this irrelevancy information to the MAC filter engine 354 so that future message(s) from this specific RV can be blocked, at least for a certain amount of time and at an earliest stage (e.g., at the MAC layer of the OSI model). Responsive to receiving the distance between the HV and the specific RV, the MAC filter engine 354 computes the expiry timer to associate it with this specific RV. The MAC filter engine 354 updates the filter table by adding the identifier of the specific RV and associated expiry timer to the filter table.

In other implementations, as described above, upon receiving the message passed by the MAC module 352, the message classification engine 358 also determines a relevance zone based on a geographic location of the HV and a specific geographic location of the specific RV, and determines whether the specific RV falls within the relevance zone. If the specific RV falls within the relevance zone, the message classification engine 358 forwards the message to the upper modules to refine relevancy information (e.g., determining a TTC). However, if the specific RV is not within the relevance zone and thus is irrelevant, the message classification engine 358 discards the message from the RV. Similarly, the message classification engine 358 notifies the MAC filter engine 354 to compute/assign the expiry timer to associate it with this specific RV, and update the filter table by adding the identifier of the specific RV and associated expiry timer to the filter table.

In some implementations, responsive to the message classification engine 358 classifying an RV into a specific zone while the relative distance between the RV and HV is below a max relative distance, the MAC filter engine 354 allocates a non-zero expiry timer to this RV. In other implementations, if the safety application applied by the application module 364 is a forward collision warning (FCW) application, the message classification engine 358 also uses certain targets that are located adjacent or next to adjacent lanes of the HV, and/or the targets traveling in the opposite heading/direction of the HV to determine irrelevancy or irrelevancy zone. In such a case, the MAC filter engine 354 may set a fixed expiry timer of 0.5 sec or one sec because the target(s) in the irrelevancy zone is unlikely again to cause a forward collision with the HV. In reality, the MAC filter engine 354 may configure these timers depending on the end goal or safety application, the tolerance, the required margin, etc.

The MAC filter engine 354 also receives feedback result(s) from upper layer modules other than the message classification engine 358 to compute an expiry timer and updates the filter table. Typically, the application module 364 implements a safety application to evaluate the possibility of collision between the HV and RV by computing a time-to-collision (TTC). A lower TTC indicates a higher degree of threat since the chance of taking any preventive action is lower. The TTC may also be used for determining current and future relevancy, e.g., configuring an expiry timer. Since the computation of TTC may involve multiple steps and complex algorithms, the information acquired at intermediate steps may also be used to set an expiry timer. In some implementations, responsive to the message classification engine 358 classifying the incoming message and determining to forward the message for processing by the safety application, the TTC decision engine 366 computes the TTC for the HV and compares the TTC to a TTC predetermined by the safety application. If the TTC does not exceed the predetermined TTC, the TTC decision engine 366 passes the message to a sensor fusion unit, a human-machine interface (HMI), or to other devices of the HV to perform a further action. If the TTC exceeds the predetermined TTC, the TTC decision engine 366, however, notifies the MAC filter engine 354 to compute the expiry timer to associate it with the specific RV, and update the filter table by adding the identifier of the specific RV and associated expiry timer to the filter table. In some implementations, the MAC filter engine 354 computes a difference between the computed TTC and the predetermined TTC and takes it as the expiry timer.

In some implementations, the MAC filter engine 354 may also receive feedback from the security validation module 360 to update the filter table. For example, the security validation module 360 may notify the MAC filter engine 354 to filter out a node/RV if the verification on these messages repeatedly fails.

Figure 7:
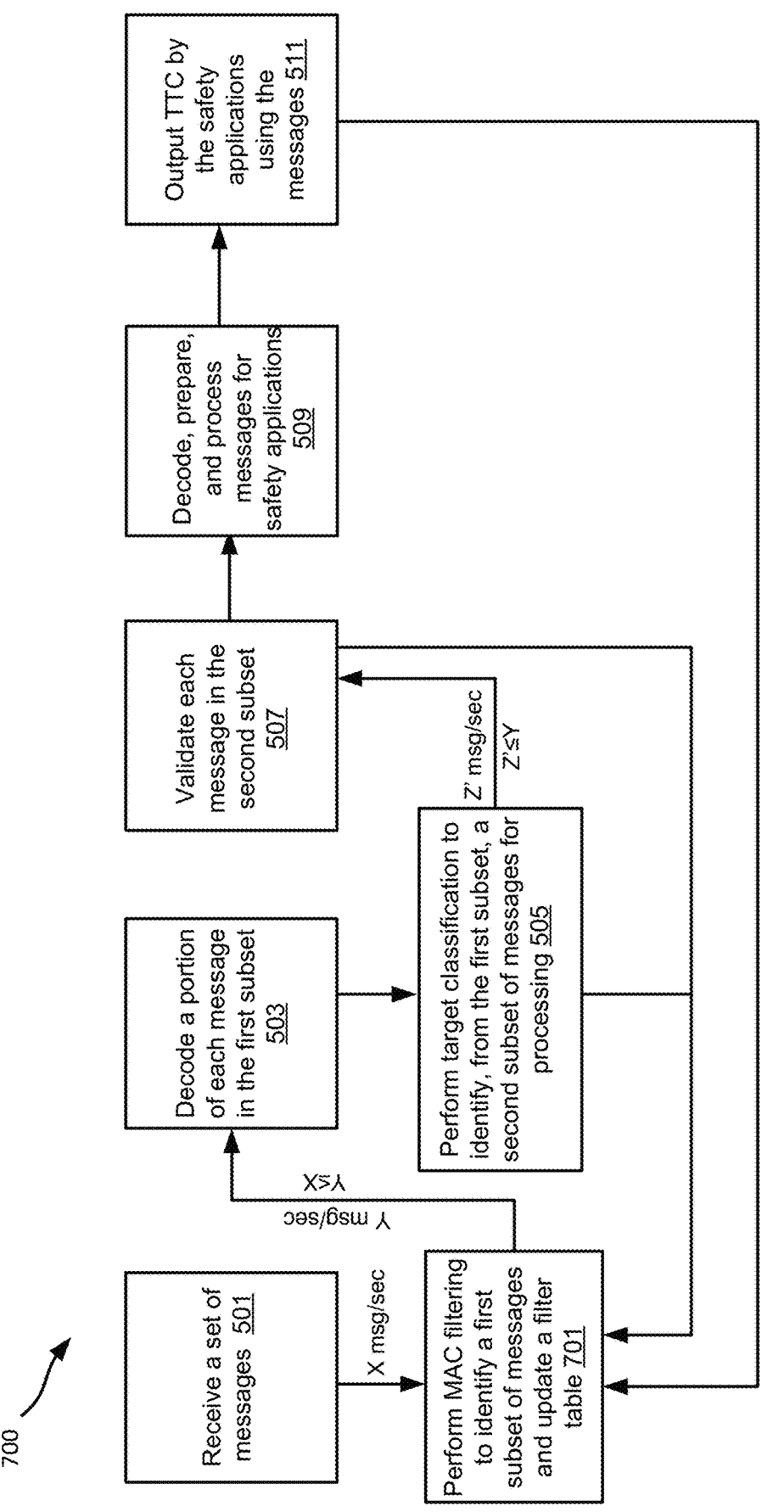
FIG. 7 is a block diagram of a message processing procedure based on MAC filtering and early target/message classification.

FIG. 7 is a block diagram of a message processing procedure 700 performed by the message processing unit 105 based on MAC filtering and early target/message classification. Compared to FIG. 5, feedback loops from upper modules/layers to the layer of MAC filtering performed by the MAC filter engine 354 at a block 701 are added. The upper modules include at least one of the message classification engine 358, the security validation module 360, and the application module 364. The MAC filter engine 354 adds another level of message filtering based on a filter table at block 701 before the early message classification performed at block 505, thereby further improving the filtering efficiency. At block 701, the MAC filter engine 354 performs filter lookup and processing for incoming messages based on the filter table, and also updates the filter table based on the feedbacks from the upper modules/layers.

Below are two example scenarios showing how relevancy and expiry timer can be determined at an early stage, e.g., at the stage of message classification, based on the distance, speed, etc. The message classification engine 358 determines that a specific RV is irrelevant based on a relevance zone or the distance with an HV, and feeds the classification result back to the MAC filter engine 354 to compute the corresponding expiry timer and update the filter table.

Assuming that two vehicles HV and RV move towards each other, the time that they will collide may be determined based on a distance between the vehicles, a relative speed, etc. In the first scenario, assuming that the HV is traveling towards the RV at 80 kilometers/hour (km/h) and the RV is traveling towards the HV at 100 km/h, the distance between the two vehicles is 800 meters. The message classification engine 358 converts the HV's speed to about 22 meters/second (m/sec) and RV's speed to about 28 m/sec, and determines that there are about 16 seconds before the two vehicles collide given the relative speed being 50 m/sec and the distance being 800 meters. Assuming that a safety application would take any applicable action when the TTC is below 5 seconds, the message classification engine 358 determines that a buffer time/relevancy margin time is 11 seconds and notifies the MAC filter engine 354 of the relevancy margin time. The relevancy margin time is the time that an RV is determined to be relevant to the HV. The MAC filter engine 354 uses this 11-second as the expiry timer for this specific RV and updates the filter table. In reality, the TTC may be computed based on the trajectories, confidence, heading, yaw, predicted path, true road/path distance, etc. The TTC may also vary quickly as vehicles rapidly accelerate towards or decelerate away from each other. Assuming that the vehicles accelerate towards each other and thus shorten the initial calculation of TTC as time progresses, e.g., from the initial 16 seconds to 13 seconds, the MAC filter engine 354 may not use 11 seconds, but rather use a lower value such as three or four seconds as the expiry time or configure an upper limit for the expiry time to avoid the re-assessment of the expiry time. Instead of computing a fixed expiry time, the MAC filter engine 354 determines a variable expiry timer based on configuration including the extra margin that a user wants to put in, an upper limit, or a combination thereof.

In a second scenario, the TTC computation is more complicated because the vehicles move with higher speeds. Assuming that the HV's speed is 200 km/h or 55 m/sec and the RV's speed is 200 km/h or 55 m/sec, the message classification engine 358 then determines that the TTC is about 7.2 seconds when the two vehicles are at least 800 meters away from each other and are in a straight-line collision path. Again, assuming that the safety application would take any applicable action when the TTC is below 5 seconds, the message classification engine 358 may determine a relevancy margin time to be 2.2 seconds. Table 1 below shows the TTC and expiry time calculation based on a different distance between the HV and RV:

TABLE 1

TTC and relevancy determination

| S.No | Distance between HV and RV | Theoretical TTC | Safety Application TTC Relevancy | Relevancy Margin | Expiry Timer |
|---|---|---|---|---|---|
| 1 | >800 meters | 7.2 sec | 5 sec | 2.2 sec | 2 sec |
| 2 | >700 and <800 meters | 6.3 sec | 5 sec | 1.3 sec | 1.3 sec |

16

TABLE 1-continued

TTC and relevancy determination

| S.No | Distance between HV and RV | Theoretical TTC | Safety Application TTC Relevancy | Relevancy Margin | Expiry Timer |
|---|---|---|---|---|---|
| 3 | >600 and <700 meters | 5.4 sec | 5 sec | 0.4 sec | 0.4 sec |
| 4 | >500 and <600 meters | 4.5 sec | 5 sec | No margin | None |

The MAC filter engine 354 communicates with other modules of the message processing unit 105 to achieve adaptive message filtering by making a trade-off filtering decision when determining target relevancy or expiry time. On one hand, the computation of relevancy information (e.g., including decoding numerous data messages) may be complex and requires non-trivial processing power. The MAC filter engine 354 and the message classification engine 358 may label many targets as irrelevant. On the other hand, to keep the processing cost relatively light, the MAC filter engine 354 and the message classification engine 358 may use a conservative cut-off boundary to label a few targets as irrelevant. As shown in Table 1, the MAC filter engine 354 may use upper limits (e.g., worst-case scenario) to compute safe boundaries. When using such conservative cut-off boundaries, the MAC filter engine 354 may simply establish such a table and look up the table to determine an expiry timer. For example, the MAC filter engine 354 may choose the expiry timer as a step function through a simple lookup table similar to what is shown in Table 1, where each of the expiry timers listed as the safety application TTC relevancy, relevancy margin, and each expiry timer is configurable.

Consider another example scenario showing how relevancy and expiry timer can be determined at a late stage, e.g., at the stage of executing a safety application by the application module 364. Assume the safety application is FCW. An example of a late stage decision logic could be in a situation wherein a message classification engine 358 classifies an RV into the ahead zone of an HV, e.g., 500 meters ahead of the HV, based on a message from RV to the HV, and determines the RV as a potential target of interest. The message classification engine 358 passes the message through an upstream flow to the application module 364. After a series of complex calculations (with or without sensor fusion), the application module 364 may determine that the potential TTC is 6.2 seconds. The MAC filter engine 354 identifies that the potential TTC of 6.2 seconds fed back from the application module 364 exceeds the safety application TTC relevancy of 5 seconds, and determines that the RV is not of relevancy to the HV for the next 1.2 seconds since the RV is 6.2 seconds away from intersecting with the HV trajectory or path. As a result, the MAC filter engine 354 updates the filter table with the unique identifier of the RV and an expiry timer of 1.2 seconds. This expiry timer may vary with the changing vehicle dynamics and a safe margin being conservative or not. In theory, an RV can rapidly accelerate towards the HV leading to a lower TTC value. Therefore, it is advantageous to use a safe margin to account for these possibilities. Also, the MAC filter engine 354 determines the safe margin depending on the end goal of a safety application.

No matter whether the MAC filter engine 354 receives feedback information from the message classification engine 358 at an early stage of the message processing procedure or from the application module 364 at a late stage, the MAC filter engine 354 updates the filter table with a non-zero expiry timer associated with a unique identifier of a specific RV.

Figure 8:
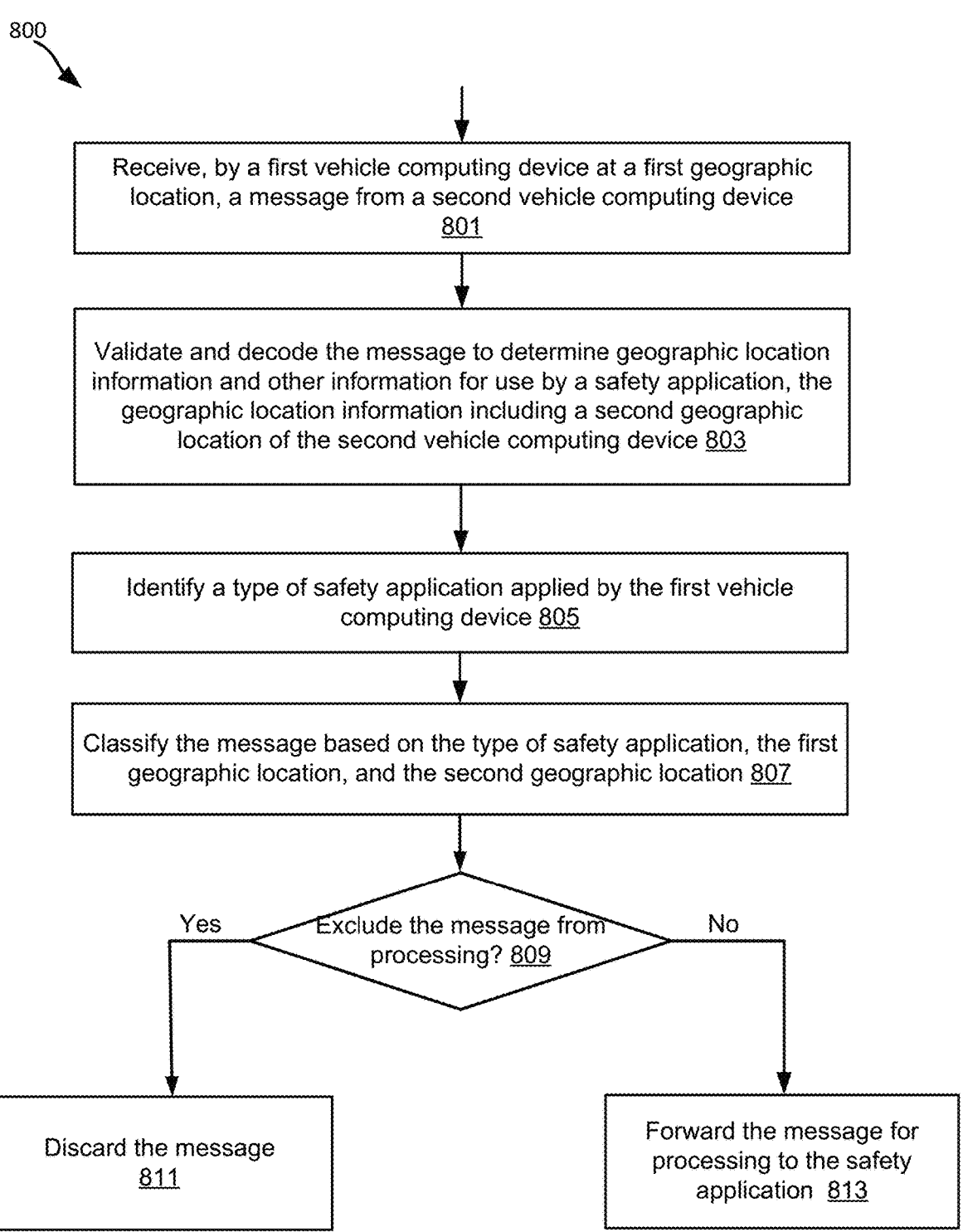
FIG. 8 is a flowchart illustrating an example method for performing early target/message classification.

FIG. 8 illustrates a flowchart 800 for performing early target/message classification. A message processing unit 105 included in a first vehicle computing device 103a associated with an HV processes message(s) from other vehicle computing devices associated with other RVs. In some implementations, the message processing unit 105 includes a message classification engine 308. At a block 801, a first vehicle computing device at a first geographic location receives a message from a second vehicle computing device. At a block 803, the message classification engine 308 validates and decodes the message to determine geographic location information and other information (e.g., a receiving timestamp) for use by a safety application, the geographic location information including a second geographic location of the second vehicle computing device. In some implementations, the message classification engine 308 decodes a portion of the message to determine a second geographic location of the second vehicle computing device. For example, the portion of the message includes only latitude, longitude, elevation coordinates. The partial decoding may allow the message to be ignored for the next few time intervals, and therefore save the computing resources otherwise used in an initial complete decoding. At a block 805, the message classification engine 308 identifies a type of safety application applied by the first vehicle computing device, for example, a forward collision warning application.

At a block 807, the message classification engine 308 classifies the message based at least in part on the type of the safety application, the first geographic location, and the second geographic location. In some implementations, the message classification engine 308 creates a location map of vehicles based on the first geographic location and the second geographic location, determines a relevance zone based on the location map and the type of application, and classifies the message by determining whether the second vehicle computing device falls within the relevance zone. The message classification engine 308 performs the classification at an early stage of the message flow, for example, at the equivalent network layer of the OSI model, which therefore saves further processing cost as well as intra vehicle bandwidth that may be used on operations such as validating the message, computing TTC, etc., performed by the upper layer/models. At a block 809, the message classification engine 308 determines, based on the message classification, whether to exclude the message from further processing. If it is determined to exclude the message, at a block 811, the message classification engine 308 discards the message. Otherwise, at a block 813, the message classification engine 308 forwards the message to the safety application for processing. For example, the message classification engine 308 passes the message for validating. After validating the message, the message classification engine 308 continues to transmit the message to the safety application for processing.

Figure 9B:
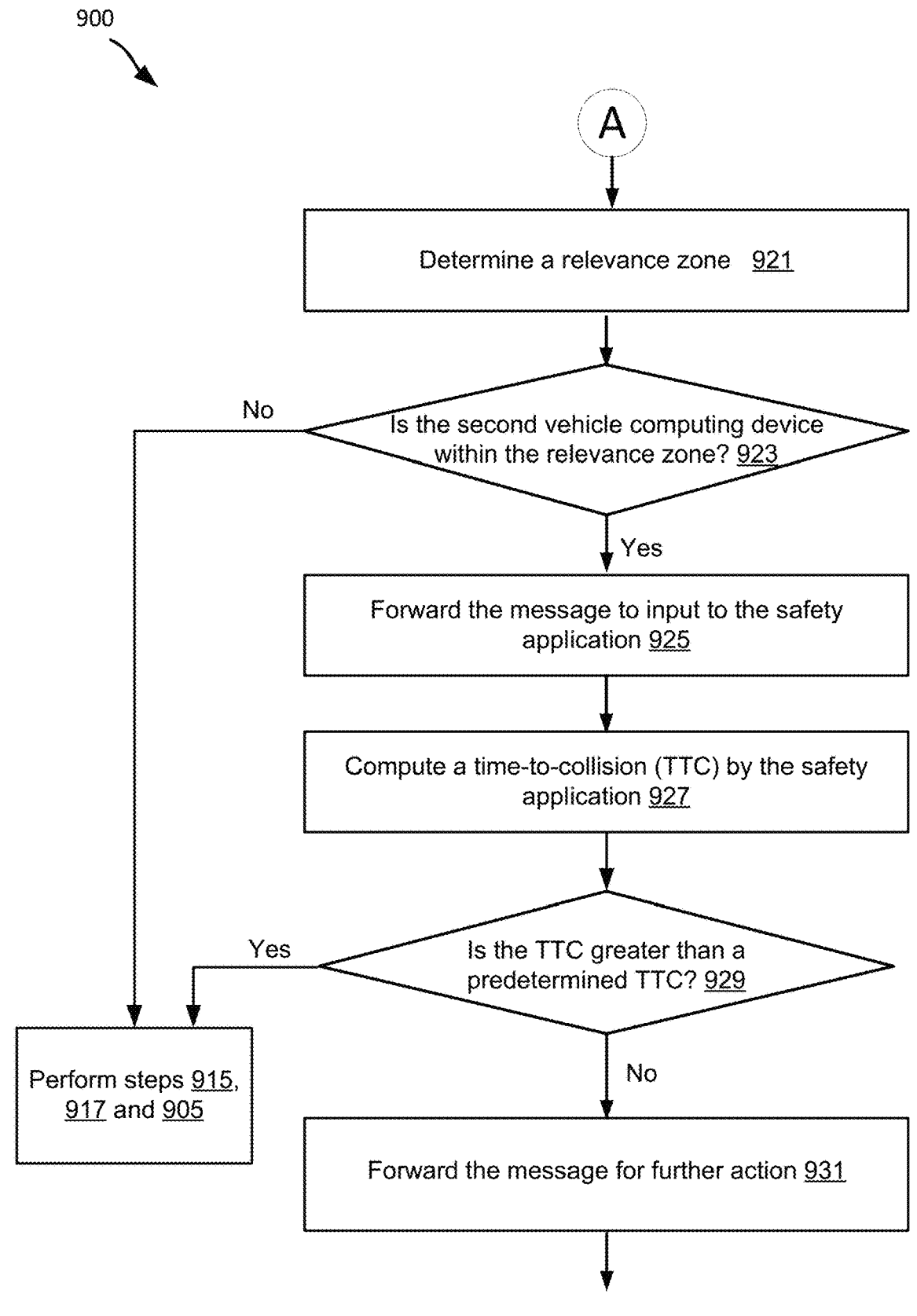

FIGS. 9A and 9B combinedly provide a flowchart 900 illustrating an example method for processing an incoming message based on early target/message classification and MAC filtering. A message processing unit 105 included in a first vehicle computing device 103a associated with an HV processes message(s) from other vehicle computing devices associated with other RVs. In some implementations, the message processing unit 105 includes a MAC filter engine 354, a message classification engine 358, and a TTC decision engine 366. At a block 901, a first vehicle computing device at a first geographic location receives a message from a second vehicle computing device. At a block 903, the MAC filter engine 354 determines whether an identifier of the second vehicle computing device (e.g., the identifier of the RV) is included in a filter table. The filter table includes the target RV(s) that is determined to be of no interest or irrelevant within the duration of an expiry timer. If the identifier of the second vehicle computing device is included in the filter table, at a block 905, the MAC filter engine 354 discards the message. However, if the identifier of the second vehicle computing device is not included in the filter table, at a block 907, the MAC filter engine 354 forwards the message to the message classification engine 358 for classification.

At a block 909, the message classification engine 358 decodes location information of the second vehicle computing device. At a block 911, the message classification engine 358 computes a distance between the first and second vehicle computing devices, e.g., the distance between the HV and RV. At a block 913, the message classification engine 358 determines whether the distance is greater than a threshold distance. If the distance is greater than the threshold distance, the message classification engine 358 determines that the RV is currently irrelevant to the HV. Therefore, the message classification engine 358 feeds the distance comparison result back to the MAC filter engine 354 to add this irrelevant RV to the filter table. At a block 915, the MAC filter engine 354 computes an expiry timer, which indicates the time for which the RV is filtered out or a duration that the RV may be considered irrelevant. This timer is a count-down timer. The MAC filter engine 354 decrements the expiry timer irrespective of a message interval. In reality, the MAC filter engine 354 may receive different messages at different intervals but may decrement the expiry timer at any interval provided it is less than or equal to an interval of the incoming message. In some implementations, the MAC filter engine 354 pre-populates a table based on the distance, speed, and other vehicle/environment parameters and extracts an expiry timer from the table. Once the expiry timer is determined, at a block 917, the MAC filter engine 354 adds the identifier and expiry timer of the second vehicle computing device to the filter table.

However, if the distance between HV and RV is not greater than a threshold distance, at a block 919, the message classification engine 358 identifies a type of safety application used by the first vehicle computing device. The message classification engine 358 then determines a relevance zone at a block 921, and determines whether the second vehicle computing device is within the relevance zone at a block 923. If the second vehicle computing device is not within the relevance zone, the message classification engine 358 proceeds to blocks 905, 915 and 917 to notify the MAC filter engine 354 to respectively discard the message, compute the expiry timer, and add the second vehicle device (e.g., the RV) to the filter table. Otherwise, at a block 925, the message classification engine 358 forwards the message to input to the safety application, e.g., implemented by the TTC decision engine 366.

At a block 927, the TTC decision engine 366 implements the safety application to compute a TTC by the safety application. At a block 929, the TTC decision engine 366 determines whether the TTC is greater than a predetermined TTC. If the computed TTC is not greater than the predetermined TTC, at a block 931, the TTC decision engine 366 forwards the message, e.g., to a sensor fusion unit, for further action. If the computed TTC is greater than the predetermined TTC, the TTC decision engine 366 notifies the MAC filter engine 354 to add an entry to the filter table. Accordingly, the MAC filter engine 354 performs operations in blocks 905, 915, and 917 to respectively discard the message, compute the expiry timer, and add the second vehicle device (e.g., the RV) to the filter table. In some implementations, the MAC filter engine 354 computes the difference between the computed TTC and the predetermined TTC and use it as the expiry timer.

The message processing procedure as described in FIGS. 9A and 9B is superior to the existing approaches in at least two aspects. The existing approaches filter nodes that are not of interest without storing and using the relevancy to determine how to act on future message(s) based on the processing of current messages, whereas the message processing procedure shown above supports multiple feedback loops to return the current message processing result back to a MAC filter engine to filter the newly incoming messages. Additionally, the message processing procedure described herein proposes an adaptive relevancy filter that can adjust an expiry timer based on the examination of the relevancy, which bypasses the need to repeatedly examine the message at every message interval.

FIGS. 10A-10H illustrate various use case scenarios using various types of safety applications. The safety applications include, but are not limited to, blind spot warning (BSW), do not pass warning (DNPW), overtaking vehicle (OTVW), emergency electronic brake lights (EEBL), emergency vehicle warning (EVW), forward collision warning (FCW), intersection movement assist (IMA), vehicle turning right in front (of bus) warning (VTRW), stationary vehicle warning (SVW), hazard location warning/road hazard signaling (HLW), control loss warning (CLW), left turn assist (LTA), lane change assist/lane change warning (LCA/LCW), rear cross path (RCP), traffic jam ahead (TJA), etc.

Figure 10A:
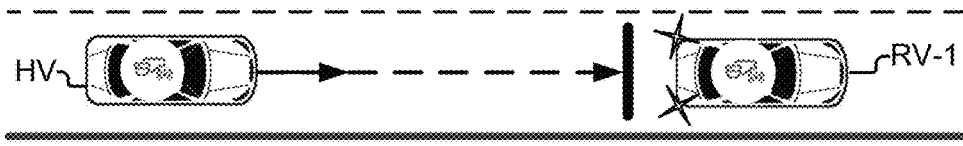
FIGS. 10A-10H illustrate various use case scenarios using various types of safety applications.

Specifically, FIGS. 10A-10D illustrate forward collision warning (FCW) use case scenarios. In the case of an FCW, the region where the target vehicles of interest would reside is potentially ahead of the same lane as the host vehicle. FIG. 10A is an example case of "stopped RV in same lane." The HV approaches RV-1 that is stopped in the same lane as the HV. The message processing unit 105 embedded in the vehicle computing device 103 of the HV receives the safety message(s) from RV(s) (including RV-1) within the range of a radio message receiver 107 at the HV. The message processing unit 105 processes the received messages and generates a warning when there is imminent danger of a rear-end crash with the stopped RV in its lane of travel. The message processing unit 105 also computes a timing of the warning (e.g., a TTC) and provides it to the driver of the HV (e.g., through a user interface of the vehicle computing device) so that the driver can avoid a rear-end crash with the stopped RV-1.

Figure 10B:
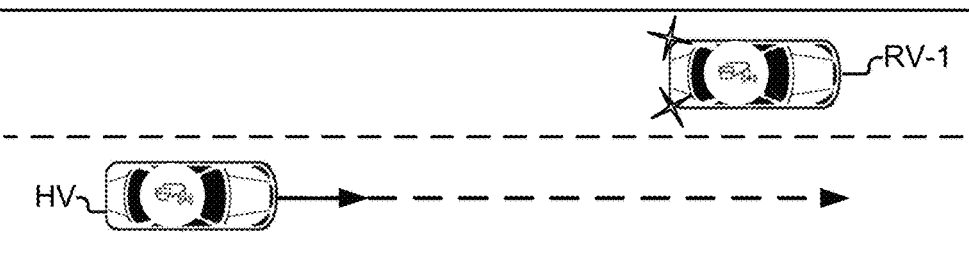

FIG. 10B is an example case of "stopped RV-1 in adjacent lane" using FCW. The HV approaches RV-1, which is stopped in the lane adjacent to the HV. The message processing unit 105 of HV does not send a warning to the driver of the HV since there is no imminent danger of a rear-end crash between HV and RV-1.

Figure 10C:
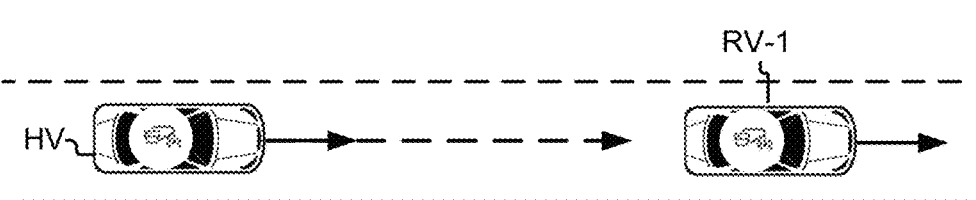

FIG. 10C is an example case of "slower moving of decelerating RV-1 in the same lane" using FCW. The HV approaches RV-1, which is moving slower and/or decelerating in the same lane as the HV. The message processing unit 105 of HV sends a warning to the HV driver when there is imminent danger of a rear-end crash with the slow-moving RV-1 in its lane of travel. The message processing unit 105 also computes a timing of the warning and provides it to the driver of HV so that the driver can avoid a rear-end crash with the slow-moving RV-1.

Figure 10D:
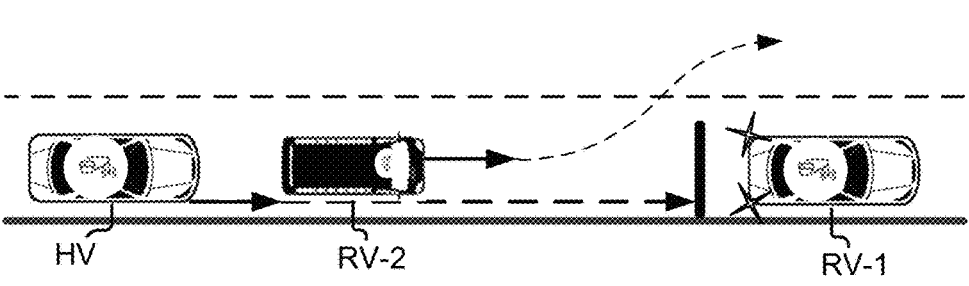

FIG. 10D is an example case of "stopped and obstructed RV" using FCW. The HV follows a moving RV-2, which in turn approaches RV-1 that is stopped in the same lane. RV-2 may or may not be equipped with the vehicle computing device 103 for communications, but RV-1 is able to communicate. RV-2 makes a lane change to avoid the stopped RV-1. The message processing unit 105 of HV sends a warning to the HV driver when there is imminent danger of a rear-end crash with the stopped RV-1 in its lane of travel. The message processing unit 105 also computes a timing of the warning and provides it to the driver of HV so that the driver can avoid a rear-end crash with the stopped RV-1.

Figure 10E:
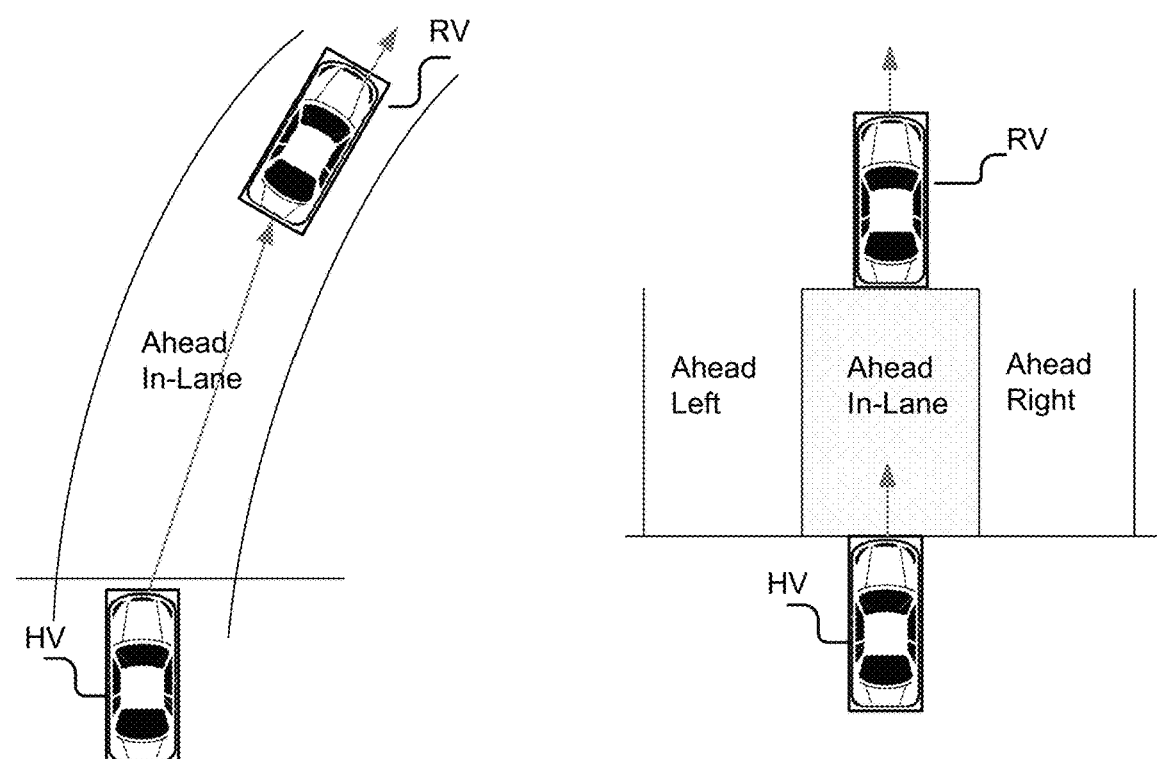

FIG. 10E is another FCW use case scenario. When there is imminent danger of a rear-end crash with a remote leading vehicle in its lane of travel, the message processing unit 105 of the HV can warn the driver of the HV. The message processing unit 105 can function in both straight and curved roadway geometries, and determine the relevant RV zones. As illustrated in FIG. 10E, the message processing unit 105 analyzes messages received from each of the RVs and determines which of the RVs are classified as "ahead in-lane." The message processing unit 105 further determines if the HV is at risk of being involved in a rear-end crash with an RV located in the same lane of travel. For example, the message processing unit 105 determines which, if any, RVs classified as "ahead in-lane" are within a range threshold (e.g., a threshold distance.). The message processing unit 105 computes the TTC and/or crash avoidance range for each "ahead in-lane" RV to determine potential forward crash threats. If at least one RV is determined to be a threat, the message processing unit 105 identifies the principal threat and provides a warning to the driver.

Figure 10F:
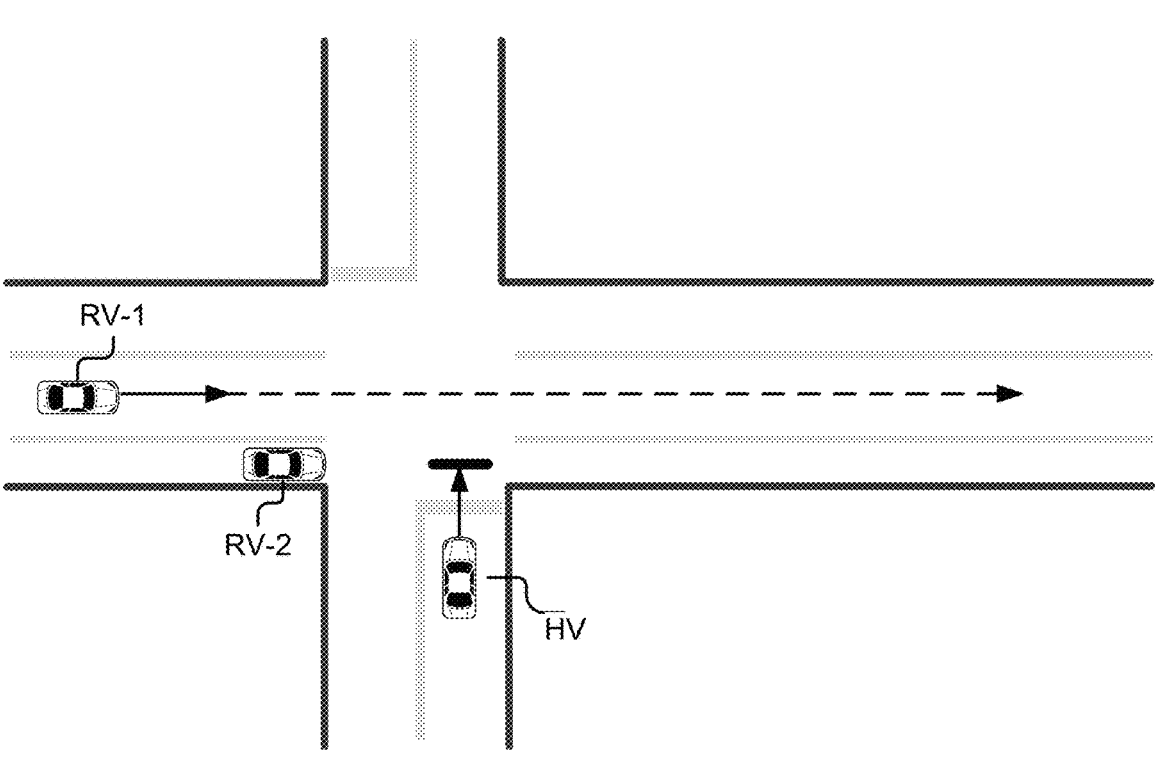
Figure 10G:
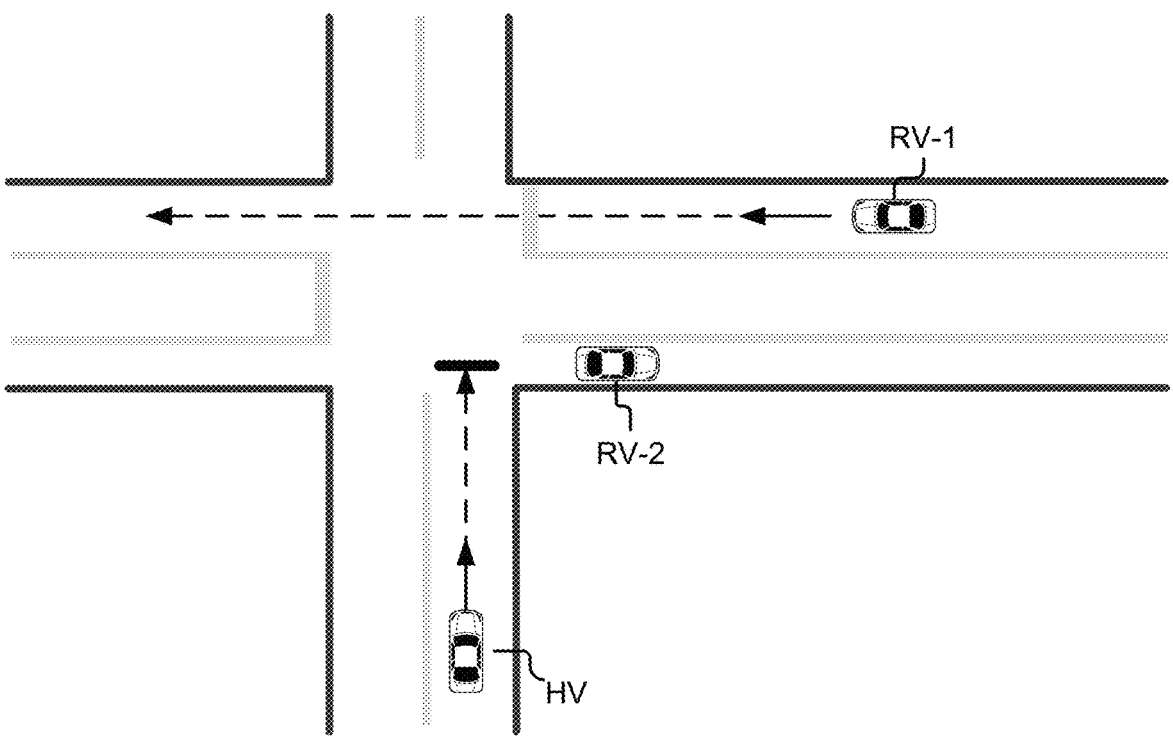
Figure 10H:
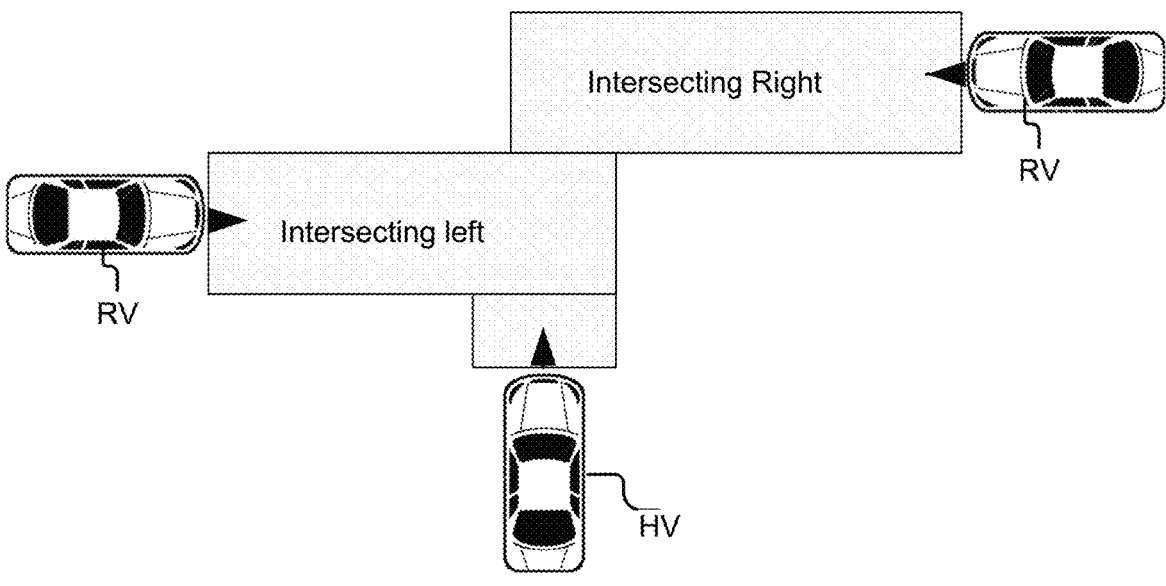

FIG. 10F-10H are example intersection movement assist (IMA) use case scenarios. By performing the IMA safety application, the message processing unit 105 warns the driver of the HV when it is not safe to enter an intersection due to a crash possibility with RVs. In FIG. 10F, the HV is stopped at an intersection and visibility may be limited by the presence of RV-2. RV-2 may or may not be equipped with the vehicle computing device 103 for communications, but RV-1 is able to communicate. RV-1 approaches the intersection from the left or right of the HV. The message processing unit 105 of the HV sends a warning to the HV driver, which indicates that a crash is predicted with RV-1 if the HV begins to enter the intersection. The message processing unit 105 also computes a timing of the warning and provides it to the driver of HV so that the driver can avoid a crash with the approaching RV-1.

FIG. 10H is an example of "both vehicles approaching intersection" using IMA. The HV approaches the intersection and its visibility may be limited by the presence of RV-2. RV-2 may or may not be equipped with the vehicle computing device 103 for communications, but RV-1 is able to communicate. RV-1 approaches the intersection from the left or right of the HV. The message processing unit 105 of the HV sends a warning to the HV driver, which indicates that conflict with RV-1 is predicted if the HV tries to enter the intersection. The message processing unit 105 also computes a timing of the warning and provides it to the driver of HV so that the driver can avoid a crash with the approaching RV-1.

FIG. 10G shows example relevance zones for RV-1 and RV-2 when the message processing unit 105 warns the driver of the HV that there is imminent danger of a crash with a remote vehicle approaching the same intersection based on IMA application.

Figure 11:
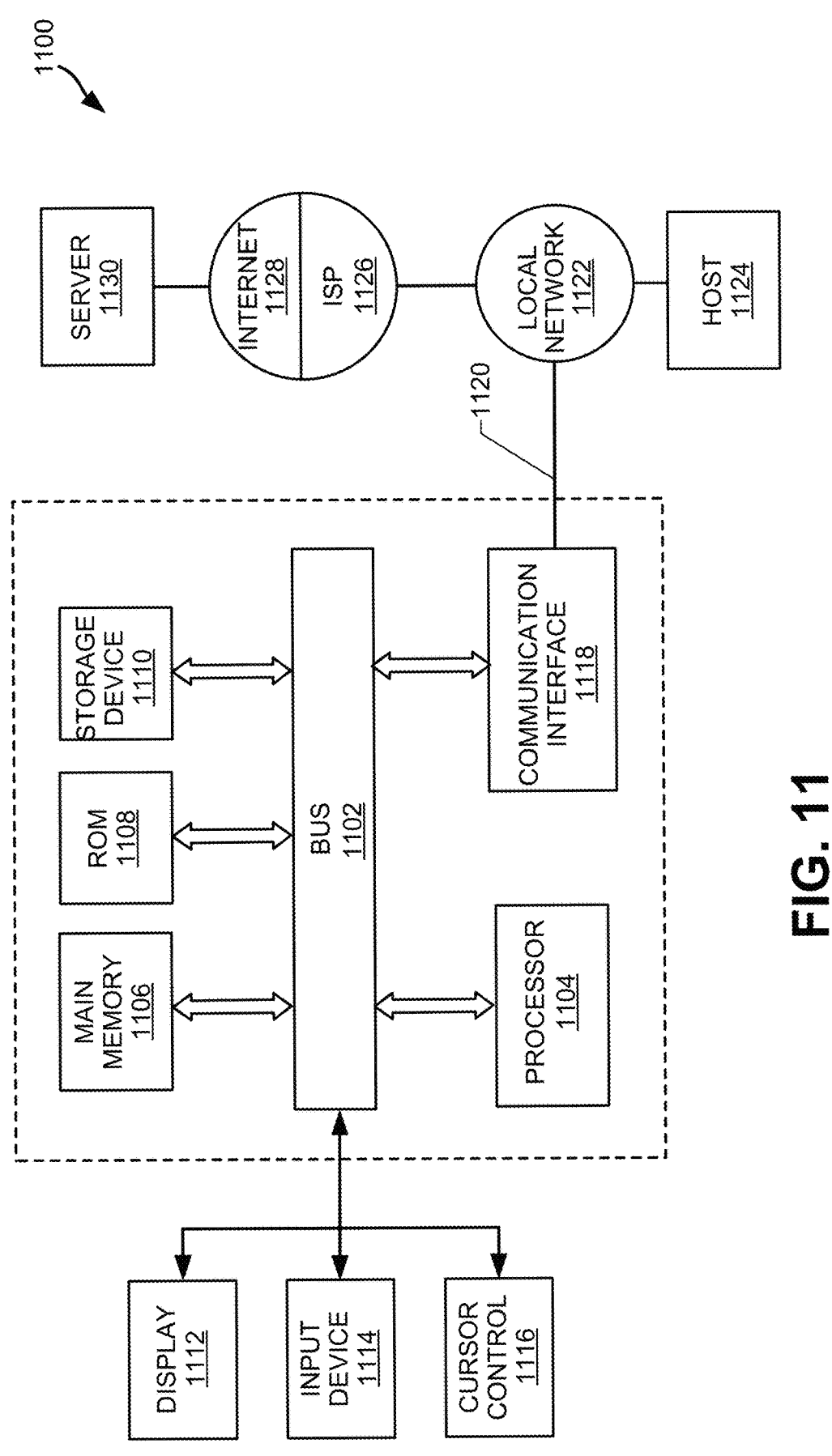
FIG. 11 is a functional block diagram of an example computer system upon which aspects of this disclosure may be implemented.

FIG. 11 is a functional block diagram of an example computer system 1100 upon which aspects of this disclosure may be implemented. It will be understood that the logic blocks illustrated in FIG. 11 represent functions, and do not necessarily correspond to particular hardware on a one-to-one basis. The computer system 1100 can include a data processor 1104, coupled by a bus 1102 to an instruction memory or main memory 1106, a read-only memory 1108, and a storage device 1110. The instruction memory 1106 can include a tangible medium retrievably storing computer-readable instructions, that when executed by the data processor 1104 cause the processor to perform functions, processes, and operations described herein, for example, in reference to FIGS. 1, 2A, 2B, 3A, and 3B.

The computer system 1100 can also include a display 1112, a user interface or other input device 1114, and a cursor control 1116, either as separate devices or combined, for example, as a touchscreen display. The computer system 1100 can also include a communications interface 1118, configured to interface with a local network 1122 for accessing a local host server 1124, and to communicate through an ISP 1126 to the Internet 1128, and access a remote server 1130.

This disclosure provides support for a system comprising: a processor, and a memory coupled to the processor and storing instructions that, when executed by the processor, cause the processor to: receive, by a first vehicle computing device at a first geographic location, a message from a second vehicle computing device, decode a portion of the message to determine a second geographic location of the second vehicle computing device, identify a type of safety application applied by the first vehicle computing device, classify the message based at least in part on the type of the safety application, the first geographic location, and the second geographic location, and determine, based on classifying the message, whether to discard the message or forward the message for processing to the safety application. In a first example of the system to classify the message, the instructions further cause the processor to: create a location map of vehicles based on the first geographic location and the second geographic location, determine a relevance zone based on the location map and the type of application, and classify the message based on determining whether the second vehicle computing device falls within the relevance zone. In a second example of the system, optionally including the first example, the instructions further cause the processor to: generate a filter table for the first vehicle computing device based on classifying the message, wherein the filter table includes a respective identifier of at least one vehicle computing device and a respective expiry timer associated with the at least one vehicle computing device, and wherein each message from each vehicle computing device included in the filter table will be discarded and excluded from processing by the safety application during a duration of the expiry timer associated with the vehicle computing device. In a third example of the system, optionally including one or both of the first and second examples, the instructions further cause the processor to: receive, at the first vehicle computing device, a new message from a specific vehicle computing device, determine whether the filter table includes an identifier of the specific vehicle computing device, responsive to determining that the filter table includes the identifier of the specific vehicle computing device, discard the new message, and responsive to determining that the filter table does not include the identifier of the specific vehicle computing device, classify the new message to determine whether forward the new message for processing by the safety application. In a fourth example of the system, optionally including one or more or each of the first through third examples, to classify the new message, the instructions further cause the processor to: compute a distance between the first vehicle computing device and the specific vehicle computing device, compare the distance to a threshold distance, and responsive to the distance exceeding the threshold distance, discard the new message, compute the expiry timer associated with the specific vehicle computing device, and add the identifier of the specific vehicle computing device and associated expiry timer to the filter table. In a fifth example of the system, optionally including one or more or each of the first through fourth examples, to classify the new message, the instructions further cause the processor to: determine a relevance zone based on the first geographic location and a specific geographic location of the specific vehicle computing device, determine whether the specific vehicle computing device falls within the relevance zone, and responsive to determining that the specific vehicle computing device falls outside the relevance zone, discard the new message, assign the expiry timer to associate with the specific vehicle computing device, and add the identifier of the specific vehicle computing device and associated expiry timer to the filter table. In a sixth example of the system, optionally including one or more or each of the first through fifth examples, responsive to classifying the new message to determine to forward the new message for processing to the safety application, the instructions further cause the processor to: compute a time-to-collision (TTC) for the first vehicle computing device, compare the TTC to a predetermined TTC determined by the safety application, responsive to the TTC exceeding the predetermined TTC, compute the expiry timer to associate with the specific vehicle computing device, and add the identifier of the specific vehicle computing device and associated expiry timer to the filter table. In a seventh example of the system, optionally including one or more or each of the first through sixth examples, to compute the TTC for the first vehicle computing device, the instructions further cause the processor to: determine a relevancy margin time based on a distance and vehicle speeds of a vehicle associated with the first vehicle computing device and a vehicle associated with the specific vehicle computing device. In an eighth example of the system, optionally including one or more or each of the first through seventh examples, the decoded portion of the message includes latitude data, longitude data, elevation data. In a ninth example of the system, optionally including one or more or each of the first through eighth examples, the safety application includes at least one of a forward collision warning application, an intersection movement assist application, a blind spot warning application, a left turn assist application, a lane change warning application, and a control loss warning application.

This disclosure also provides support for a method comprising: receiving, by a first vehicle computing device at a first geographic location, a message from a second vehicle computing device, decoding a portion of the message to determine a second geographic location of the second vehicle computing device, identifying a type of safety application applied by the first vehicle computing device, classifying the message based at least in part on the type of the safety application, the first geographic location, and the second geographic location, and determine, based on classifying the message, whether to discard the message or forward the message for processing to the safety application. In a first example of the method to classify the message, the method further comprises: creating a location map of vehicles based on the first geographic location and the second geographic location, determining a relevance zone based on the location map and the type of application, and classifying the message based on determining whether the second vehicle computing device falls within the relevance zone. In a second example of the method, optionally including the first example, the method further comprises: generating a filter table for the first vehicle computing device based on classifying the message, wherein the filter table includes a respective identifier of at least one vehicle computing device and a respective expiry timer associated with the at least one vehicle computing device, and wherein each message from each vehicle computing device included in the filter table will be discarded and excluded from processing by the safety application during a duration of the expiry timer associated with the vehicle computing device. In a third example of the method, optionally including one or both of the first and second examples, the method further comprises: receiving, at the first vehicle computing device, a new message from a specific vehicle computing device, determining whether the filter table includes an identifier of the specific vehicle computing device, responsive to determining that the filter table includes the identifier of the specific vehicle computing device, discarding the new message, and responsive to determining that the filter table does not include the identifier of the specific vehicle computing device, classifying the new message to determine whether forward the new message for processing by the safety application. In a fourth example of the method, optionally including one or more or each of the first through third examples, to classify the new message, the method further comprises: computing a distance between the first vehicle computing device and the specific vehicle computing device, comparing the distance to a threshold distance, and responsive to the distance exceeding the threshold distance, discarding the new message, computing an expiry timer associated with the specific vehicle computing device, and adding the identifier of the specific vehicle computing device and associated expiry timer to the filter table. In a fifth example of the method, optionally including one or more or each of the first through fourth examples, to classify the new message, the method further comprises: determining a relevance zone based on the first geographic location and a specific geographic location of the specific vehicle computing device, determining whether the specific vehicle computing device falls within the relevance zone, and responsive to determining that the specific vehicle computing device falls outside the relevance zone, discarding the new message, assigning an expiry timer to associate with the specific vehicle computing device, and adding the identifier of the specific vehicle computing device and associated expiry timer to the filter table. In a sixth example of the method, optionally including one or more or each of the first through fifth examples, responsive to classifying the new message to determine to forward the new message for processing to the safety application, the method further comprises: computing a time-to-collision (TTC) for the first vehicle computing device, comparing the TTC to a predetermined TTC determined by the safety application, responsive to the TTC exceeding the predetermined TTC, computing the expiry timer to associate with the specific vehicle computing device, and adding the identifier of the specific vehicle computing device and associated expiry timer to the filter table. In a seventh example of the method, optionally including one or more or each of the first through sixth examples, to compute the TTC for the first vehicle computing device, the method further comprises: determining a relevancy margin time based on a distance and vehicle speeds of a vehicle associated with the first vehicle computing device and a vehicle associated with the specific vehicle computing device. In an eighth example of the method, optionally including one or more or each of the first through seventh examples, the decoded portion of the message includes latitude data, longitude data, elevation data. In a ninth example of the method, optionally including one or more or each of the first through eighth examples, the safety application includes at least one of a forward collision warning application, an intersection movement assist application, a blind spot warning application, a left turn assist application, a lane change warning application, and a control loss warning application.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 106, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

The invention claimed is:

1. A system comprising:
a processor; and
a memory coupled to the processor and storing instructions that, when executed by the processor, cause the processor to:
receive, by a first vehicle computing device at a first geographic location, a message from a second vehicle computing device, wherein the message is received via a vehicle-to-everything (V2X) wireless communication protocol at a message interval of 100 milliseconds or less;
decode a portion of the message to determine a second geographic location of the second vehicle computing device;
identify a type of safety application applied by the first vehicle computing device;
classify the message, at a network layer of a message processing stack prior to security validation, based at least in part on the type of the safety application, the first geographic location, and the second geographic location, wherein classifying the message comprises determining a relevance zone for the type of safety application and determining whether the second vehicle computing device falls within the relevance zone;
determine, based on classifying the message, whether to discard the message or forward the message for processing to the safety application, wherein determining to discard the message comprises determining that the second vehicle computing device falls outside the relevance zone; and
responsive to determining to discard the message, reduce a processing load on the first vehicle computing device by preventing decoding of subsequent messages from the second vehicle computing device for a duration determined based on a distance between the first geographic location and the second geographic location.

2. The system of claim 1, wherein, to classify the message, the instructions further cause the processor to:
create a location map of vehicles based on the first geographic location and the second geographic location;
determine a relevance zone based on the location map and the type of application; and
classify the message based on determining whether the second vehicle computing device falls within the relevance zone.

3. The system of claim 1, wherein the instructions further cause the processor to:
generate a filter table for the first vehicle computing device based on classifying the message,
wherein the filter table includes a respective identifier of at least one vehicle computing device and a respective expiry timer associated with the at least one vehicle computing device, and
wherein each message from each vehicle computing device included in the filter table will be discarded and excluded from processing by the safety application during a duration of the expiry timer associated with the vehicle computing device.

4. The system of claim 3, wherein, the instructions further cause the processor to:
receive, at the first vehicle computing device, a new message from a specific vehicle computing device;
determine whether the filter table includes an identifier of the specific vehicle computing device;
responsive to determining that the filter table includes the identifier of the specific vehicle computing device, discard the new message; and
responsive to determining that the filter table does not include the identifier of the specific vehicle computing device,
classify the new message to determine whether to forward the new message for processing by the safety application.

5. The system of claim 4, wherein, to classify the new message, the instructions further cause the processor to:
compute a distance between the first vehicle computing device and the specific vehicle computing device;
compare the distance to a threshold distance; and
responsive to the distance exceeding the threshold distance,
discard the new message;
compute the expiry timer associated with the specific vehicle computing device; and
add the identifier of the specific vehicle computing device and associated expiry timer to the filter table.

6. The system of claim 4, wherein, to classify the new message, the instructions further cause the processor to:
determine a relevance zone based on the first geographic location and a specific geographic location of the specific vehicle computing device;
determine whether the specific vehicle computing device falls within the relevance zone; and responsive to determining that the specific vehicle computing device falls outside the relevance zone,
discard the new message;
assign the expiry timer to associate with the specific vehicle computing device; and
add the identifier of the specific vehicle computing device and associated expiry timer to the filter table.

7. The system of claim 4, wherein, responsive to classifying the new message to determine to forward the new message for processing to the safety application, the instructions further cause the processor to:
compute a time-to-collision (TTC) for the first vehicle computing device;
compare the TTC to a predetermined TTC determined by the safety application;
responsive to the TTC exceeding the predetermined TTC, compute the expiry timer to associate with the specific vehicle computing device; and
add the identifier of the specific vehicle computing device and associated expiry timer to the filter table.

8. The system of claim 7, wherein, to compute the TTC for the first vehicle computing device, the instructions further cause the processor to:
determine a relevancy margin time based on a distance and vehicle speeds of a vehicle associated with the first vehicle computing device and a vehicle associated with the specific vehicle computing device.

9. The system of claim 1, wherein the decoded portion of the message includes latitude data, longitude data, and elevation data.

10. The system of claim 1, wherein the safety application includes at least one of a forward collision warning application, an intersection movement assist application, a blind spot warning application, a left turn assist application, a lane change warning application, and a control loss warning application.

11. A method comprising:
receiving, by a first vehicle computing device at a first geographic location, a message from a second vehicle computing device, wherein the message is received via a vehicle-to-everything vehicle (V2X) wireless communication protocol at a message interval of 100 milliseconds or less;
decoding a portion of the message to determine a second geographic location of the second vehicle computing device;
identifying a type of safety application applied by the first vehicle computing device;
classifying, at a network layer of a message processing stack prior to security validation, the message based at least in part on the type of the safety application, the first geographic location, and the second geographic location, wherein classifying the message comprises determining a relevance zone for the type of safety application and determining whether the second vehicle computing device falls within the relevance zone;
determining, based on classifying the message, whether to discard the message or forward the message for processing to the safety application, wherein determining to discard the message comprises determining that the second vehicle computing device falls outside the relevance zone; and
responsive to determining to discard the message, reduce a processing load on the first vehicle computing device by at least partially preventing decoding of subsequent messages from the second vehicle computing device for a duration determined based on a distance between the first geographic location and the second geographic location.

12. The method of claim 11, wherein, to classify the message, the method further comprises:
creating a location map of vehicles based on the first geographic location and the second geographic location;
determining a relevance zone based on the location map and the type of application; and
classifying the message based on determining whether the second vehicle computing device falls within the relevance zone.

13. The method of claim 11, wherein the method further comprises:
generating a filter table for the first vehicle computing device based on classifying the message,
wherein the filter table includes a respective identifier of at least one vehicle computing device and a respective expiry timer associated with the at least one vehicle computing device, and
wherein each message from each vehicle computing device included in the filter table will be discarded and excluded from processing by the safety application during a duration of the expiry timer associated with the vehicle computing device.

14. The method of claim 13, wherein the method further comprises:
receiving, at the first vehicle computing device, a new message from a specific vehicle computing device;
determining whether the filter table includes an identifier of the specific vehicle computing device;
responsive to determining that the filter table includes the identifier of the specific vehicle computing device, discarding the new message; and
responsive to determining that the filter table does not include the identifier of the specific vehicle computing device,
classifying the new message to determine whether forward the new message for processing by the safety application.

15. The method of claim 14, wherein, to classify the new message, the method further comprises:
computing a distance between the first vehicle computing device and the specific vehicle computing device;
comparing the distance to a threshold distance; and
responsive to the distance exceeding the threshold distance,
discarding the new message;
computing an expiry timer associated with the specific vehicle computing device; and
adding the identifier of the specific vehicle computing device and associated expiry timer to the filter table.

16. The method of claim 14, wherein, to classify the new message, the method further comprises:
determining a relevance zone based on the first geographic location and a specific geographic location of the specific vehicle computing device;
determining whether the specific vehicle computing device falls within the relevance zone; and
responsive to determining that the specific vehicle computing device falls outside the relevance zone,
discarding the new message;
assigning an expiry timer to associate with the specific vehicle computing device; and
adding the identifier of the specific vehicle computing device and associated expiry timer to the filter table.

17. The method of claim 14, wherein, responsive to classifying the new message to determine to forward the new message for processing to the safety application, the method further comprises:

computing a time-to-collision (TTC) for the first vehicle computing device;

comparing the TTC to a predetermined TTC determined by the safety application;

responsive to the TTC exceeding the predetermined TTC, computing the expiry timer to associate with the specific vehicle computing device; and adding the identifier of the specific vehicle computing device and associated expiry timer to the filter table.

18. The method of claim 17, wherein, to compute the TTC for the first vehicle computing device, the method further comprises:

determining a relevancy margin time based on a distance and vehicle speeds of a vehicle associated with the first vehicle computing device and a vehicle associated with the specific vehicle computing device.

19. The method of claim 11, wherein the decoded portion of the message includes latitude data, longitude data, elevation data.

20. The method of claim 11, wherein the safety application includes at least one of a forward collision warning application, an intersection movement assist application, a blind spot warning application, a left turn assist application, a lane change warning application, and a control loss warning application.

\* \* \* \* \*